(12) United States Patent
Chen et al.

(10) Patent No.: US 7,327,996 B2
(45) Date of Patent: Feb. 5, 2008

(54) HIGH SENSITIVITY RADIO RECEIVER

(75) Inventors: Ning Chen, Yokohama (JP); Yoshiaki Tarusawa, Yokosuka (JP); Kei Satoh, Yokosuka (JP); Shoichi Narahashi, Yokohama (JP); Noriyoshi Terada, Yokosuka (JP); Toshio Nojima, Sapporo (JP)

(73) Assignee: NTT DoCoMo, Inc., Tokyo (JP)

( * ) Notice: Subject to any disclaimer, the term of this patent is extended or adjusted under 35 U.S.C. 154(b) by 666 days.

(21) Appl. No.: 10/725,002

(22) Filed: Dec. 2, 2003

(65) Prior Publication Data

US 2004/0162042 A1 Aug. 19, 2004

(30) Foreign Application Priority Data

Dec. 3, 2002 (JP) ............................ 2002-351115
Dec. 3, 2002 (JP) ............................ 2002-351116

(51) Int. Cl.
*H04B 1/10* (2006.01)
(52) U.S. Cl. .................. 455/301; 455/300; 455/63.1; 455/339
(58) Field of Classification Search ................ 455/301, 455/300, 63.1
See application file for complete search history.

(56) References Cited

U.S. PATENT DOCUMENTS 4,616,694 A * 10/1986 Hsieh ........................ 165/47

6,181,718 B1  1/2001  Kobayashi et al.
6,480,706 B1  11/2002 Mimura et al.

FOREIGN PATENT DOCUMENTS

| EP | 1 014 480 A2 | 6/2000 |
| JP | 11330748 A | * 11/1999 |
| JP | 11330759 A | * 11/1999 |

OTHER PUBLICATIONS

Ta-Shing Chu, et al., "Fiber Optic Microcellular Radio", IEEE Transactions on Vehicular Technology, vol. 40, No. 3, Aug. 1991, pp. 599-606.

* cited by examiner

*Primary Examiner*—Matthew Anderson
*Assistant Examiner*—Minh Dao
(74) *Attorney, Agent, or Firm*—Oblon, Spivak, McClelland, Maier & Neustadt, P.C.

(57) ABSTRACT

The invention relates to a high sensitivity receiver installed outdoors which may be used in a base station of a mobile communication system, for example. A received radio frequency signal is converted into a signal in a desired frequency band by a reception bandpass filter RXF3, is subject to a low noise amplification to a desired level by a low noise reception amplifier LNA4, and the amplified signal is converted into an optical signal by a laser diode LD5. RXF3, LNA4 and LD5 are confined in a heat shielding box. LD5 is cooled by cooling means to the order of critical temperature where RXF3, for example, assumes a superconducting state, whereby the dynamic range is increased and stabilized.

10 Claims, 29 Drawing Sheets

HIGH SENSITIVITY RADIO RECEIVER

BACKGROUND OF THE INVENTION

The present invention relates to a radio receiver which may be used in a mobile communication base station system, for example, and in particular, to a high sensitivity radio receiver which exhibits an improved reception sensitivity achieved through the cooling of a radio frequency receiver section and which converts a received signal into an optical signal to be delivered as an output.

PRIOR ART

FIG. 1 shows a block diagram of a conventional high sensitivity radio receiver.

The conventional high sensitivity receiver comprises an antenna 1, an antenna feeder 2 for transmitting a signal received by the antenna 1, a reception bandpass filter (hereafter referred to as "RXF") 3 for selecting a signal in a desired band, a low noise reception amplifier (hereafter referred to as "LNA") 4 for amplifying an output from RXF3 to a desired level, a laser diode (hereafter referred to as "LD") 5, an output port 6, a transmission line 20 formed by an optical fiber cable, and an opto-electric transducer (hereafter referred to as "O/E") 21. RXF3, LNA4 and LD5 are contained in a single casing. While not shown, an isolator may be provided between RXF3 and LNA4 in order to achieve a matching therebetween. LD5 transduces an electric signal which is output from LNA4 into an optical signal to deliver an optical signal from the output port 6. The optical signal which is delivered from the output port 6 is conveyed on the transmission line 20 and is converted by O/E21 into an electric signal again to be delivered as a received signal. (See, for example, literature 1: Ta-Shing Chu Fellow, IEEE, and Michael J. Gans, "Fiber Optic Microcellular Radio", IEEE TRANSACTIONS ON VEHICULAR TECHNOLOGY, VOL.40, No.3, AUGUST 1991, pp599-606). An assembly including LD5, output port 6, transmission line 20 and O/E21 is referred to as an optical transmission assembly.

In the high sensitivity radio receiver mentioned above, the received signal which is delivered from LNA4 is converted into an optical signal by LD5 before it is transmitted on the optical fiber cable. Accordingly, in comparison to the transmission of an electric signal which utilizes a coaxial cable, a reduction in the weight and the loss and an increase in the bandwidth of the transmission line are enabled.

A functional arrangement of a conventional high sensitivity radio receiver which uses an array antenna for the antenna 1 will be described with reference to FIG. 2. An arrangement for the number of antenna elements which is equal to n=4 is illustrated.

The conventional high sensitivity radio receiver shown comprises the antenna 1 which is formed by four antenna elements 1a, 1b, 1c and 1d, an element feeder line 2 (2a, 2b, 2c and 2d) connected to each antenna element, a reception phase shifter 14 formed by reception phase shifter circuits (14a, 14b, 14c, 14d) which adjust for phase differences between received signals from respective element feeder lines, reception bandpass filter means (RXF3) including filters (3a, 3b, 3c, 3d) which select and pass signals in desired reception bands from the outputs from the reception phase shifter circuits 14a, 14b, 14c and 14d, a low noise reception amplifier (LNA) 4 (formed by amplifier sections 4a, 4b, 4c, 4d) which provides a low noise amplification of respective outputs from RXF3 to desired levels, a combiner 15 for combining outputs from individual sections of LNA4, LD5 which converts an output from the combiner 15 into an optical signal, a reception output port 6 which delivers the output signal from LD5, a transmission line 20 formed by an optical fiber cable and O/E 21. The reception phase shifter 14, RXF3, LNA4, the combiner 15 and LD5 are contained in a casing 7.

The reception phase shifter 14 is constructed as illustrated in FIG. 3, for example. Received signals having a wavelength $\lambda$ which are incident with an angle of depression $\theta$ arrive at the antenna with a phase difference of $$2\pi d \sin \theta / \lambda$$

between adjacent antenna elements which are spaced apart by a spacing d. (In the example shown in FIG. 3, the received sigfial has a lagging phase which increases in a direction from 1d toward 1a.) Accordingly, received signals from the antenna elements 1b, 1c and 1d are combined by sequentially adding a phase lag equal to $\Delta\Phi=2\pi d \sin \theta/\lambda$ thereto as referenced to the received signal of the antenna element 1a. Accordingly, when the signals are incident in the direction indicated by the angle of depression $\theta$, the received signals from individual antenna elements are combined at an equal phase to achieve a strongest reception, thus allowing the center of the antenna beam to be directed in the direction indicated by the angle of depression $\theta$. In a mobile communication base station system, a design may be employed so that the reception sensitivity of the base station with respect to a signal transmitted from a mobile station which is located within the service area of the base station be increased by sloping the center of the antenna beam toward the ground surface. While not shown in FIG. 3, where the antenna 1 is also used as the transmitting antenna, the center of the transmitting antenna beam of the base station may be sloped toward the ground surface in order to reduce radio interferences with adjacent areas.

The received signal delivered from the combiner 15 of the conventional receiver shown in FIG. 2 is converted into an optical signal by LD5 in the similar manner as shown in FIG. 1 and the optical signal is, conveyed on the transmission line 20, and converted into an electric signal again by O/E21 to be delivered as received signals by amplifier sections (4a to 4D), which are fed with an operating power from power terminals 50a to 50d.

A high sensitivity radio receiver which is provided with an array antenna may be cooled to improve the reception sensitivity as disclosed in U.S. Pat. No. 6,480,706, for example. Specifically, as illustrated in broken lines in FIG. 2, the reception phase shifter 14, RXF3, LNA4 and the combiner 15 may be contained in a heat shielding box 8 in the similar manner as the high sensitivity receiver shown in FIG. 1 to be cooled by cooling means 9 so as to be maintained at a given temperature. The cooling means 9 includes a cold head having a cooling member 9a which is formed by a copper plate and on which the reception phase shifter 14, RXF3, LNA4 and the combiner 15 are mounted. The reception phase shifter 14, RXF3 and the like are formed by a superconducting material which assumes a superconducting state upon cooling, and are cooled by the cooling means 9 until the reception phase shifter 14, and RXF3 and the like assume a superconducting state and are maintained at such temperature, thus achieving a drastic reduction in the circuit loss. An operating power to the cooling means 9 is fed from a power terminal 90.

In the conventional high sensitivity receivers shown in FIGS. 1 and 2, an optical transmission assembly 22 of the receiver has a dynamic range (hereafter referred to as "DR") which is a parameter totally reflecting the gain, noise and distortion responses of the optical transmission assembly 22. The definition of the dynamic range will now be described with reference to FIG. 4 where the abscissa represents the frequency while the ordinate represents an output power. When two carrier signals Sc1 and Sc2 having frequencies f1 and f2 and having an equal level are transmitted through the optical transmission assembly 22, a dynamic range DR is defined as a maximum C/N ratio (carrier power/noise power) which can be accomplished at the output of the optical transmission assembly 22 under the condition that the powers $P_{D1}$ and $P_{D2}$ of cross modulation distortion components D1 and D2 between frequencies 2f1-f2 and 2f2-f1 do not exceed the noise power $P_N$.

A high sensitivity radio receiver as mentioned above is often installed outdoors and in this instance, a change in the environmental temperature may cause a big variation in the E/O response of LD5. The dynamic range DR is principally influenced by the E/O response of the LD5, and thus undergoes a large variation as the environmental temperature varies.

On the other hand, the number of multiplexible channels m is known as one of indices which represent the reception performance of a high sensitivity receiver. When the number of multiplexible channels m is high, a relationship between the number of multiplexible channels m and the dynamic range DR can be expressed by the following approximation:

$$m \approx \sqrt{\frac{2}{3}} \left[ \frac{DR}{\text{prescribed } C/N \text{ ratio}} \right]^{3/2} \quad (1)$$

(See literature of T. Olson, "An RF and Microwave Fiber-Optic Design Guide", Microwave Journal, 1996, 39, (8) pp.54-78). Accordingly, it is possible that a required number of multiplexible channels m cannot be secured when the dynamic range DR undergoes a variation.

By way of example, when DFB type LD is used for the LD5, and when the operating temperature of LD5 rises under the normal temperature, for example, from 298K (25° C.) to 318K (45° C.), it is possible that the dynamic range DR may be reduced by 3.3 dB. In this instance, assuming that the number of multiplexible channels m at 298K is equal to thirty two waves, a corresponding number at 318K will be on the order of ten waves according to the equation (1), demonstrating a very large degradation in the number of multiplexible channels m in response to an increase in the operating temperature of LD5.

In view of this, Peltier elements are generally used in order to stabilize the operating temperature of LD5 in the prior art. However, it is difficult to stabilize the temperature of LD5 by using Peltier elements in an outdoor environment where the environmental temperature varies largely. For this reason, it has been extremely difficult to secure the dynamic range DR which accomplishes a desired number of multiplexible channels m in a stable manner despite any variation in the environmental temperature when conventional high sensitivity receiver is installed outdoors.

It is an object of the present invention to provide a high sensitivity radio receiver which is robust against a change in the environmental temperature to provide a low loss/low noise while allowing the dynamic range DR of an optical transmission assembly to be increased than in the prior art if a high sensitivity receiver is installed outdoors.

SUMMARY OF THE INVENTION

With a high sensitivity radio receiver according to the present invention, a received radio frequency signal is passed through a reception band pass filter means to be converted into a signal in a desired frequency band. An output signal from the reception bandpass filter means is subject to a low noise amplification to a desired level by a low noise reception amplifier, an output signal of which is converted by LD into an optical signal to be delivered. The reception bandpass filter means and the low noise reception amplifier are contained in a heat shielding box, which is cooled to a substantially constant temperature by cooling means. In particular, the LD is also contained within the heat shielding box to be maintained below a normal temperature.

As a result of the described arrangement, since the LD is maintained below a normal temperature, it affords a greater dynamic range than in the prior art, allowing an increase in the number of multiplexible channels m. If the receiver is subject to a temperature variation as experienced in the prior art, such allowance makes the receiver less susceptible to the influence of a temperature variation when an equal number of channels is considered. Since the reception bandpass filter means and the low noise reception amplifier are also cooled, the occurrence of thermal noises is minimized, contributing to the low loss/low noise.

MODES OF CARRYING OUT THE INVENTION

Embodiment 1

Figure 1:
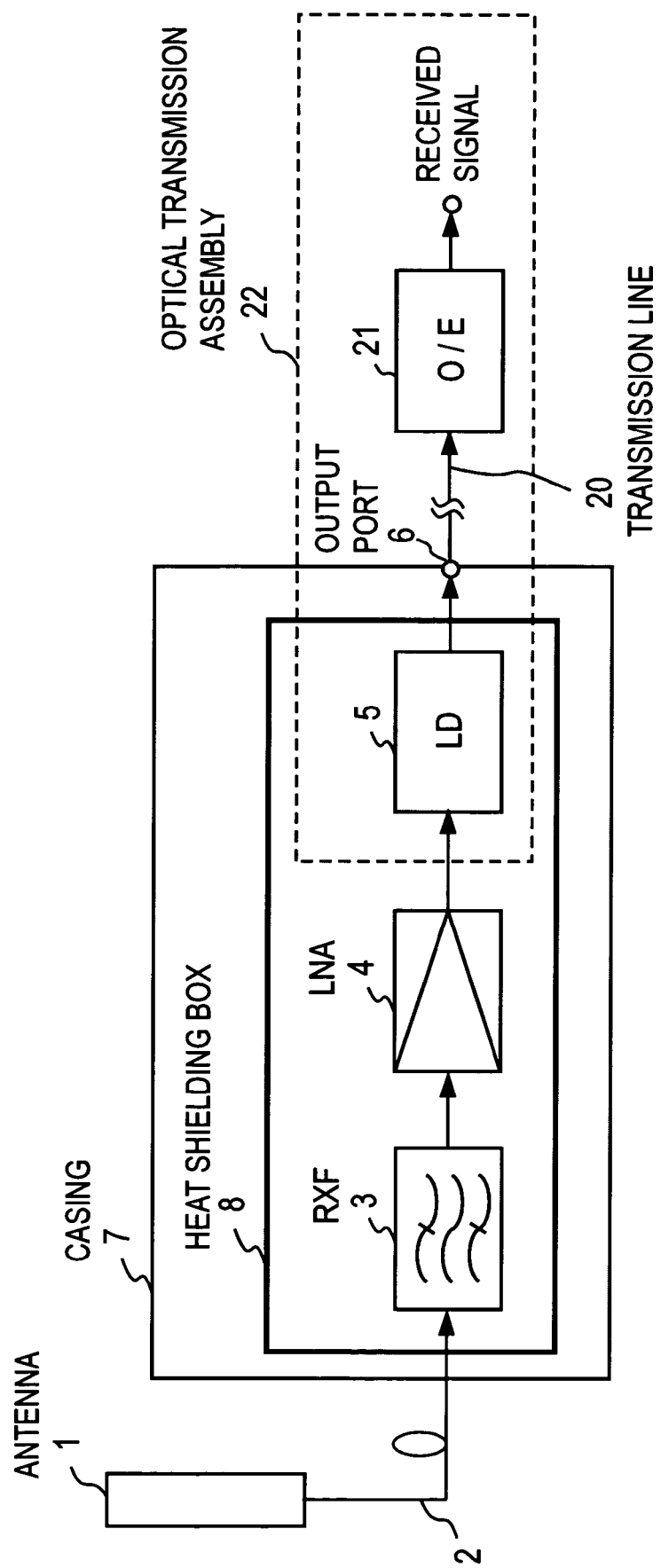
FIG. 1 is a block diagram of an exemplary functional arrangement of a conventional high sensitivity receiver.
Figure 5:
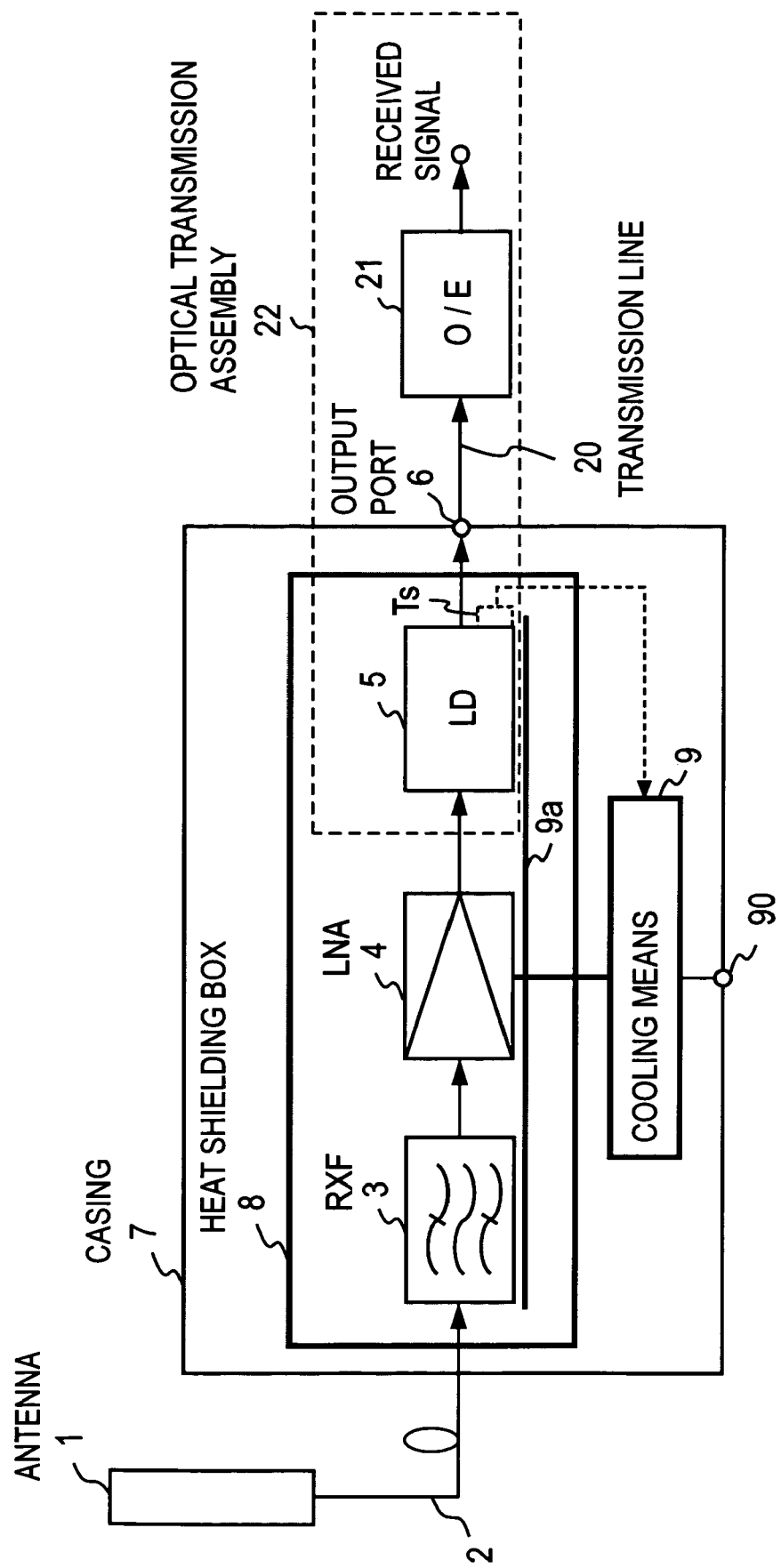
FIG. 5 is a block diagram showing a functional arrangement of a fundamental embodiment of a high sensitivity receiver according to the present invention.

FIG. 5 shows an embodiment of a high sensitivity radio receiver according to the present invention, and parts corresponding to those shown in FIG. 1 are designated by like reference characters as used before. In the description to follow, parts shown which correspond to those illustrated in the drawings which have been mentioned above are designated by like reference characters, and their duplicate description will be omitted. In comparison to the arrangement shown in FIG. 1, this embodiment is distinct in that RXF3 LNA4 and LD5 are confined in a heat shielding box 8 which may comprise a Dewar flask, for example, and are cooled by cooling means 9 which operate in response to a power supply from the outside through a power terminal 90. In this example, RXF3, LNA4 and LD5 are cooled by a single cooling unit. The cooling means 9 has a cold head on which a cooling member 9a is mounted, and RXF3, LNA4 and LD5 are mounted on the cooling member 9a. These devices are cooled through the common cooling member 9a or cooled by a single cooling unit. Both the heat shielding box 8 and the cooling means 9 are contained in a single casing 7.

A commercially available unit such as shown in the cited U.S. patent may be used for the cooling means 9. Such cooling means utilize a heat exchange cycle through the compression and the expansion of the helium gas, for example, and is capable of cooling down to very low temperature on the order of several tens K. It comprises a cryogenic cooler, a heater, a temperature sensor which is mounted on the cooling member 9a to detect its temperature and a temperature control circuit. The temperature control circuit compares the temperature of the cooling member 9a which is determined by the temperature sensor against a desired temperature, and if the cooling member 9a exhibits a higher temperature, the heat absorption of the cooler is increased while if the temperature of the cooling member is low, the heat generation of the heater is increased. An adjustment which takes place in this manner maintains the operating temperature of the cooling member 9a at a desired temperature in a stable manner over a prolonged period of time. In this instance, it is preferred that the temperature of LD5 be detected by a temperature sensor Ts as indicated by dotted lines in FIG. 5 in order to maintain the temperature at a desired value. The interior of the heat shielding box 8 may be drawn to a vacuum condition to interrupt a heat conduction from an ambient environment and to alleviate a load imposed upon the cooler while preventing a frosting on LD5 as a result of the sublimation of a water vapor in the air when LD5 is cooled to a cryogenic temperature.

Figure 6:
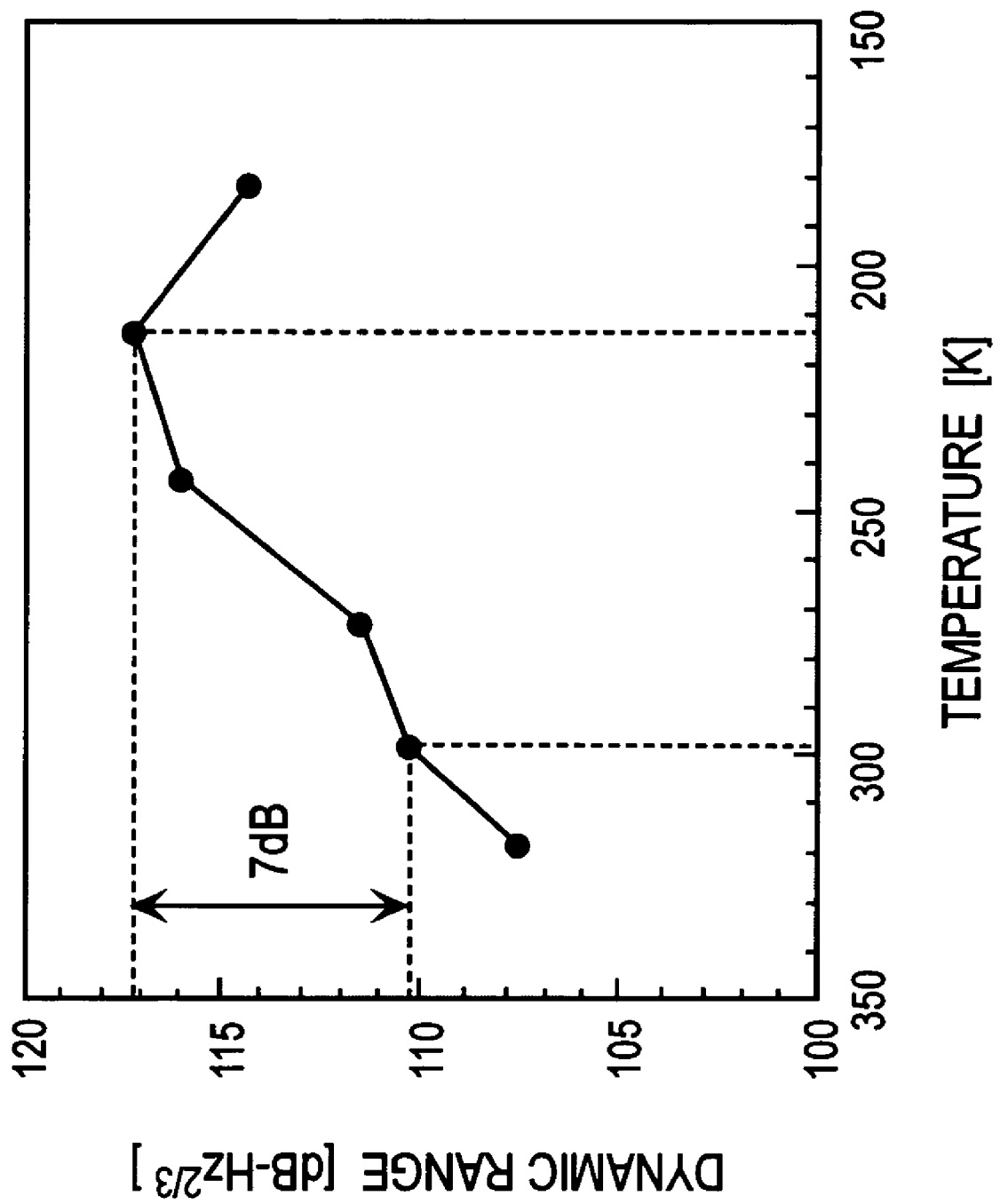
FIG. 6 graphically shows a result of an experiment demonstrating the dynamic range DR of LD-operating temperature response.

When LD5 is cooled to a point below a normal temperature, the dynamic range DR of the optical transmission assembly 22 can be increased. A result of an exemplary experiment demonstrating the operating temperature response of DB type LD is shown in FIG. 6 where the abscissa represents the temperature while the ordinate represents the dynamic range DR. In this example, when the operating temperature of LD5 is set up at 213K, the dynamic range DR of the optical transmission assembly can be improved by an amount on the order of 7 dB over the dynamic range which prevails when the operating temperature is at the normal temperature 298K (25° C.). Supposing that the number of multiplexible channels m at 298K is equal to thirty two waves, it will be seen from the equation (1) that the number of multiplexible channels m at 213K will increase to as much as three hundred and sixty waves. In this manner, the finding of the present invention allows a drastic increase in the number of multiplexible channels m by cooling LD5 to a low temperature.

According to this embodiment, the dynamic range of LD5 can be increased by cooling LD5 to a point below a normal temperature, as mentioned above, and accordingly, when an equal number of multiplexible channels is considered, the arrangement is less susceptible to a variation in the environmental temperature as compared with the prior art. In addition, RXF3 and LNA4 are cooled together with LD5 by the cooling means 9 within the heat shielding box 8 to be maintained at a desired temperature. In other words, a heat capacity which is greater than the heat capacity contemplated for stabilizing LD by Peltier elements is controlled to a desired temperature, and accordingly, the dynamic range of LD5 is further less susceptible to the influence of a variation in the environmental temperature.

This also applies to other embodiments which are described below.

When RXF3 and LNA4 are similarly cooled by the cooling means 9 to be maintained at a constant cooling temperature, a fluctuation in the electrical responses of RXF3 and LNA4 in response to a change in the environmental temperature can be prevented, contributing to increasing the dynamic ranges of these devices and to reducing thermal noises which are generated therein. When such LD5 having an E/O response which maximizes the dynamic range DR of the optical transmission assembly at or near the critical temperature of a superconducting material (several tens K) or the critical temperature of a higher temperature superconducting material (for example, 77.4K) is chosen, such RXF3 which is formed of a superconducting material or a higher temperature superconducting material is used and when RXF3, LNA4 and LD5 are cooled to a point below the critical temperature by the cooling means 9, the reception sensitivity can be improved. In this instance, if multiple stages of resonators are used to construct RXF3, the loss remains small since RXF3 assumes a superconducting state, thus allowing a steep attenuation response of RXF3 to be obtained.

As a consequence, the use of a high sensitivity radio receiver according to this embodiment allows a received signal to be obtained from a low level received signal with a prescribed C/N ratio while simultaneously securing a sufficient dynamic range DR for the optical transmission assembly 22. It will be noted from the response shown in FIG. 6 that the dynamic range DR increases sharply at a temperature equal to or below 270K, and thus it is seen that it is preferable to maintain LD5 at or below 270K. It will also be seen that in a temperature range between 240K and 200K, the dynamic range DR becomes greater and has a smaller change with the temperature change, and this indicates that it is preferable to maintain LD5 in this range. Where a maximized dynamic range DR is desired, this can be achieved by maintaining LD5 at a temperature on the order of 213K.

The dynamic range DR-operating temperature response of LD5 is not limited to one shown in FIG. 6, but it is preferred to maintain LD5 at a temperature below a normal temperature and which is in a range where a change in the dynamic range DR is relatively less susceptible to the influence of the temperature change. In consideration of these factors, a target high sensitivity receiver should be set up in accordance with a desired dynamic range DR and a desired reception sensitivity so that one of these assumes a most preferred condition even though the other is not in its most preferred condition. The temperature sensor used with the cooling means 9 may be located in a similar manner as in the prior art, for example, may be located to detect the temperature of the cooling member 9a to keep a change in the dynamic range DR with the operating temperature sufficiently small as compared with the prior art. However, when the temperature sensor Ts is used to detect the temperature of the LD5 as mentioned above, a change in the dynamic range DR with a variation in the operating temperature can be further reduced. All of these considerations apply to any one of embodiments to be described below.

Embodiment 2

In the embodiment 2, RXF3, LNA4 and LD5 are divided in two groups, one of which is cooled by a first cooling unit while the other is cooled by a second cooling unit.

Figure 7:
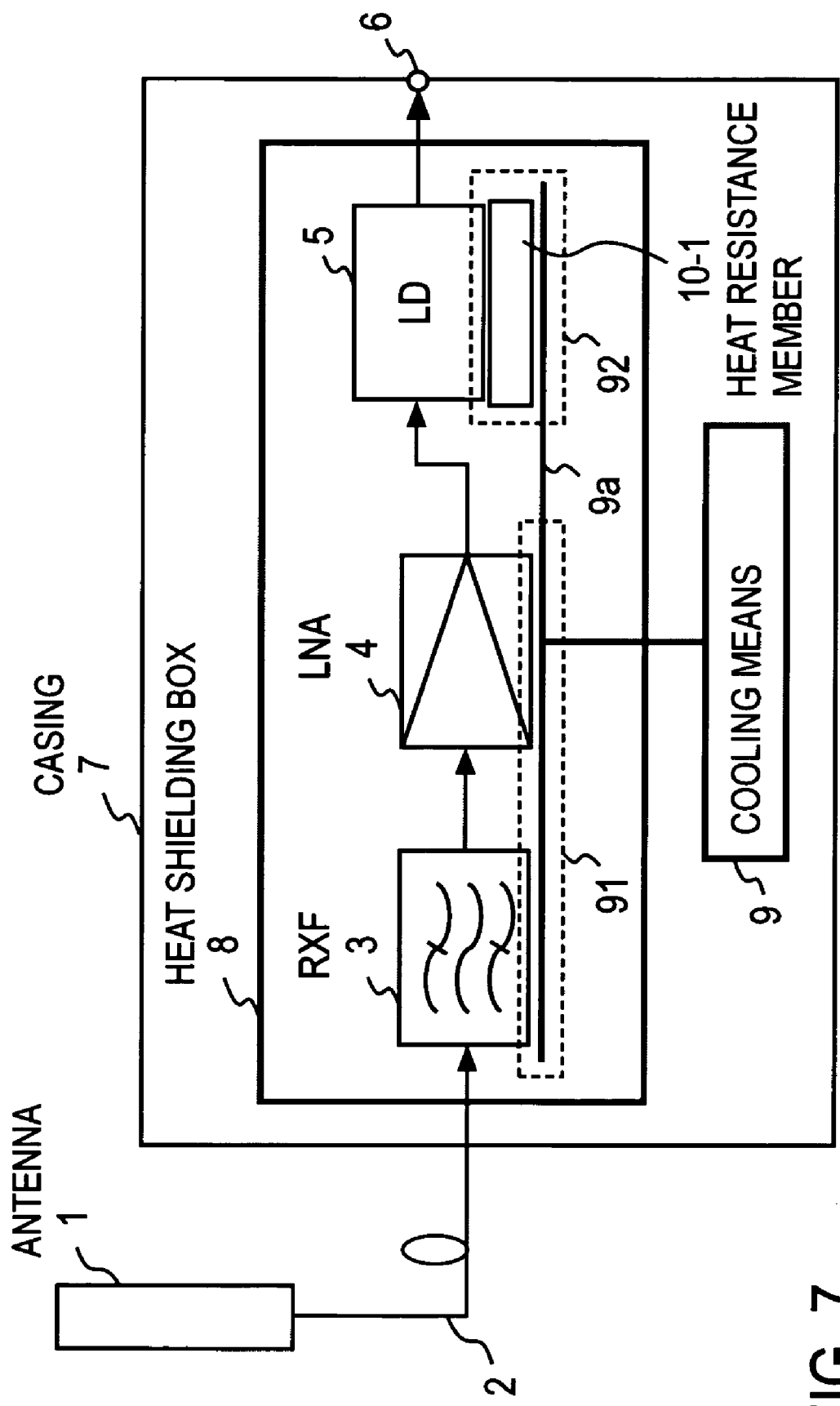
FIG. 7 is a block diagram of an embodiment in which a plurality of cooling units are formed by a cooling member and a heat resistance member.

FIG. 7 shows an embodiment where RXF3 and LNA4 on one hand and LD5 on the other hand are cooled to different temperatures.

What is distinct in this embodiment in comparison to the arrangement shown in FIG. 5 is the fact that RXF3 and LNA4 are directly mounted on the cooling member 9a while LD5 is mounted thereon through a heat resistance member 10-1 interposed therebetween. This means that RXF3 and LNA4 are directly cooled by the cooling member 9a, but LD5 is cooled by the cooling member 9a through the heat resistance member 10-1. The heat resistance member 10-1 has a relatively low thermal conductivity, and an aluminum plate or a ceramic plate having a thermal conductivity which is less than a copper plate is used, for example.

With this arrangement, RXF3 is maintained at a first temperature in a stable manner for a prolonged period of time. The heat resistance member 10-1 conducts heat which is generated by the operation of LD5 to the cooling member 9a, and maintains LD5 at a second temperature in a stable manner for a prolonged period of time. Thus, the use of the heater resistance member 10-1 provides a required temperature offset between the first and the second temperature.

The first temperature is chosen to be the critical temperature of the superconducting material which is used to form RXF3, for example. At this temperature, RXF3 assumes a superconducting state. Accordingly, if multiple stages of resonators are used to construct RXF3, the loss is reduced, and a steep attenuation response can be attained while simultaneously reducing the thermal noises which are generated within RXF3.

On the other hand, the second temperature is chosen to be a temperature which is necessary to operate LD5 with a preferred E/O response. For example, in the exemplary experimental data shown in FIG. 6, the dynamic range DR of the optical transmission assembly 22 is maximized by the E/O response of LD5 at the temperature of 213K. Accordingly, in order to maximize the number of multiplexible channels m of the optical transmission assembly 22, it is desirable that the second temperature for LD5 be set up at 213K.

Examples of the first and the second temperatures have been mentioned above. However, the first temperature which is preferred for RXF3 is not generally consistent with the second temperature which is preferred for LD5. Accordingly, in the present embodiment, a temperature control by the cooling means 9 is exercised to maintain RXF3 at the first temperature in the stable manner, and the heat resistance member 10-1 is interposed between LD5 and the cooling member 9a so that LD5 is stabilized at the second temperature which is higher than the first temperature. A required temperature offset between the second and the first temperature can be implemented by a suitable choice of the thermal conductivity and configuration of the material which is used to construct the heat resistance member 10-1.

It will be seen that the cooling means 9 may be regarded as including a cooling unit 91 which performs a cooling operation by a direct thermal connection with the cooling member 9a, and another cooling unit 92 which performs a cooling operation by thermal connection through the heat resistance member 10-1. In this embodiment, RXF3 and LNA4 forms one group while LD5 forms another group, and these groups are cooled by the cooling unit 91 and the cooling unit 92, respectively.

Figure 8:
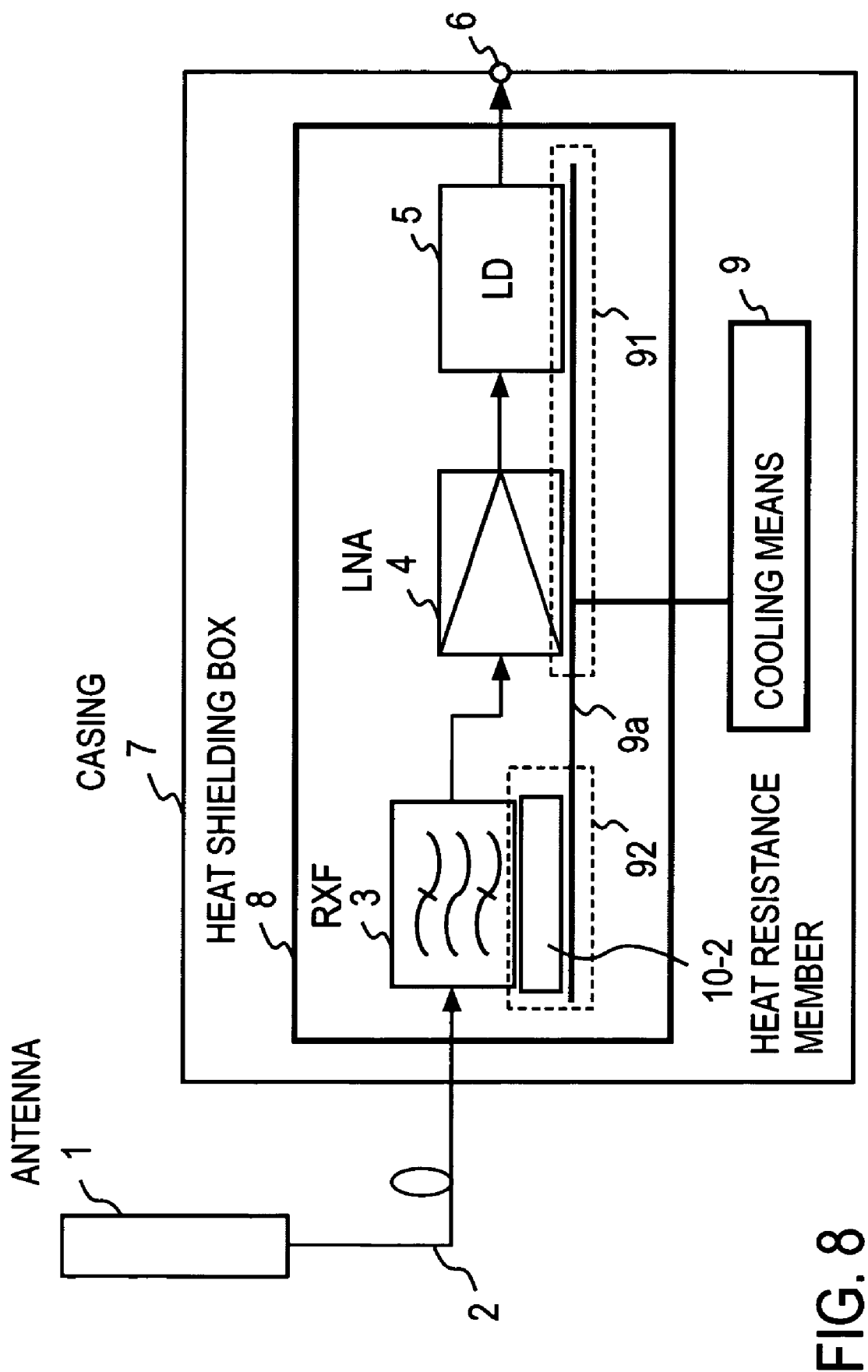
FIG. 8 is a block diagram of another embodiment in which a plurality of cooling units are formed by a cooling member and a heat resistance member.

FIG. 8 shows an embodiment in which RXF3 forms one group while LNA4 and LD5 form another group and these groups are cooled to different temperatures.

As compared with the arrangement shown in FIG. 5, this embodiment is distinct in that RXF3 is mounted on the cooling member 9a through the interposed heater resistance member 10-2 to be cooled by the cooling unit 92 while LNA4 and LD5 are directly mounted on the cooling member 9a to be cooled by the cooling unit 91. RXF3 is cooled by the cooling member 9a through the interposed heat resistance member 10-2 and is maintained at a first temperature in a stable manner for a prolonged period of time. LD5 is directly cooled by the cooling member 9a and is maintained at the second temperature which is below the first temperature in a stable manner for a prolonged period of time. This is because depending on the characteristic of LD5, it is possible that the operating temperature where the dynamic range DR is maximized may be lower than the critical temperature for RXF3, and conversely, a higher temperature superconducting material having a critical temperature equal to or higher than 77.4K may come into existence, and for this reason, the arrangement shown in FIG. 8 may be effective.

Figure 9:
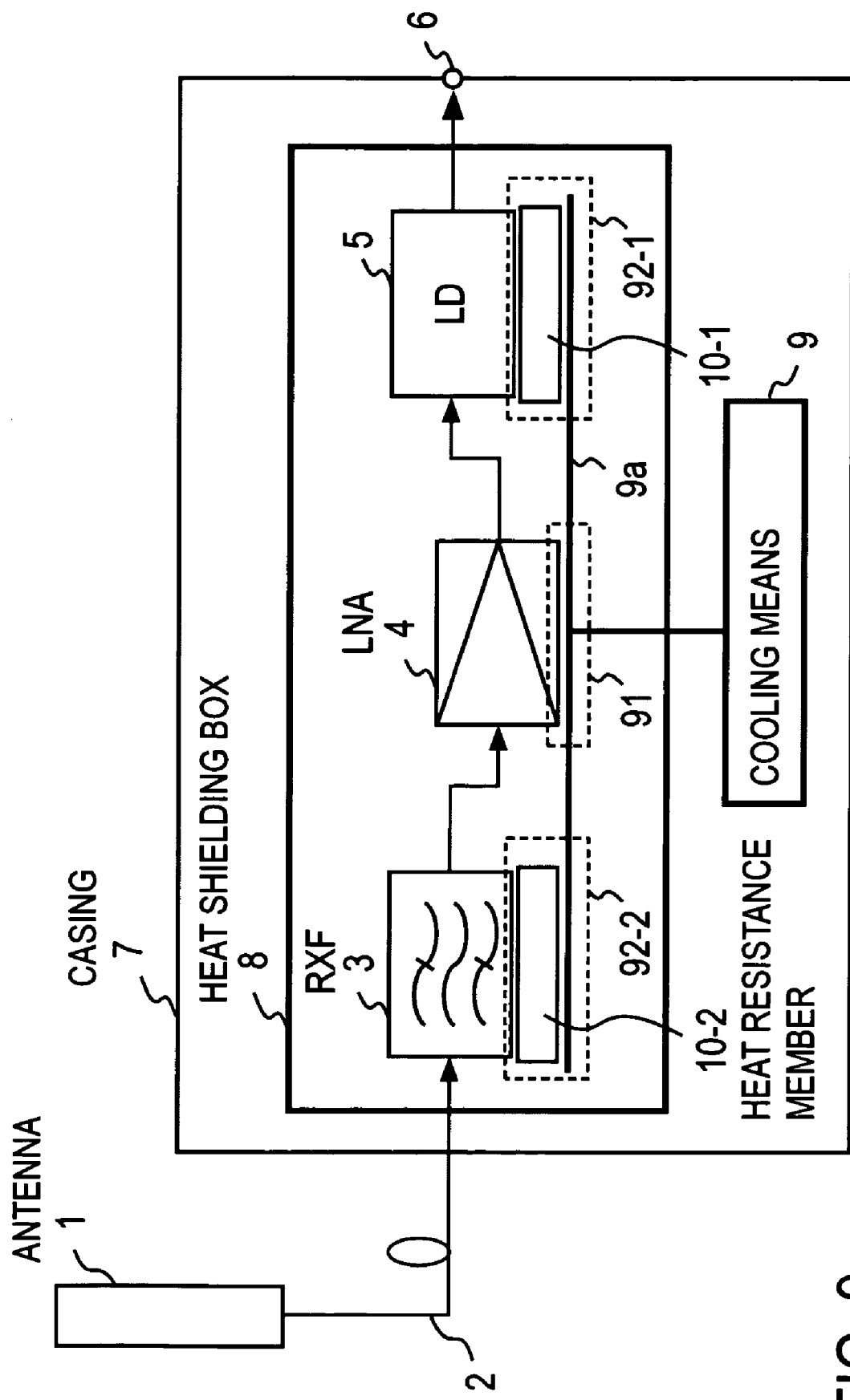
FIG. 9 is a block diagram of an embodiment in which a plurality of cooling units are formed by a cooling member and heat resistance members.

FIG. 9 shows an embodiment in which RXF3, LNA4 and LD5 are cooled to separately different temperatures.

A distinction of this embodiment over the arrangement of FIG. 7 resides in the fact that RXF3 is cooled by the cooling member 9a through the heat resistance member 10-2 interposed therebetween. In the arrangement shown in FIG. 9, RXF3, LD5 and LNA4 are maintained at a first temperature, a second temperature, and a third temperature, respectively, in a stable manner for a prolonged period of time. The provision of the heat resistance members 10-2 and 10-1 allows a desired temperature offset between the first and third temperature, and a desired temperature offset between the second and the third temperature to be set up. To give examples of the first, the second and the third temperature, for RXF3 which is constructed with a higher temperature superconducting material, the first temperature may be set up at or around 77K, the second temperature may be set up at 213K for the LD5 which is illustrated by the exemplary experimental data shown in FIG. 6, and the third temperature may be set up on the order of several tens K in order to minimize the thermal noises which are generated within LNA4.

The cooling means 9 used in the embodiment of FIG. 9 may be regarded as including a cooling unit 91 which is directly cooled by the cooling member 9a, and two other cooling units 92-1 and 92-2 which are cooled through the heat resistance members 10-1 and 10-2, respectively.

As will be understood from above description of several embodiments, the cooling means 9 cools the interior of the heat shielding box 8 to a given temperature. However, it may be required that RXF3, LNA4 and LD5 are all controlled to a common temperature or that one device be maintained at a constant temperature distinct from two other devices or that all the devices be maintained at mutually different constant temperatures. Of these requirements, it is desirable to detect the temperature of one device with a temperature sensor and to control it to a desired value depending on the performance required of the receiver and to control other devices substantially to their intended temperatures. This also applies to embodiments which will be described below.

Figure 10A:
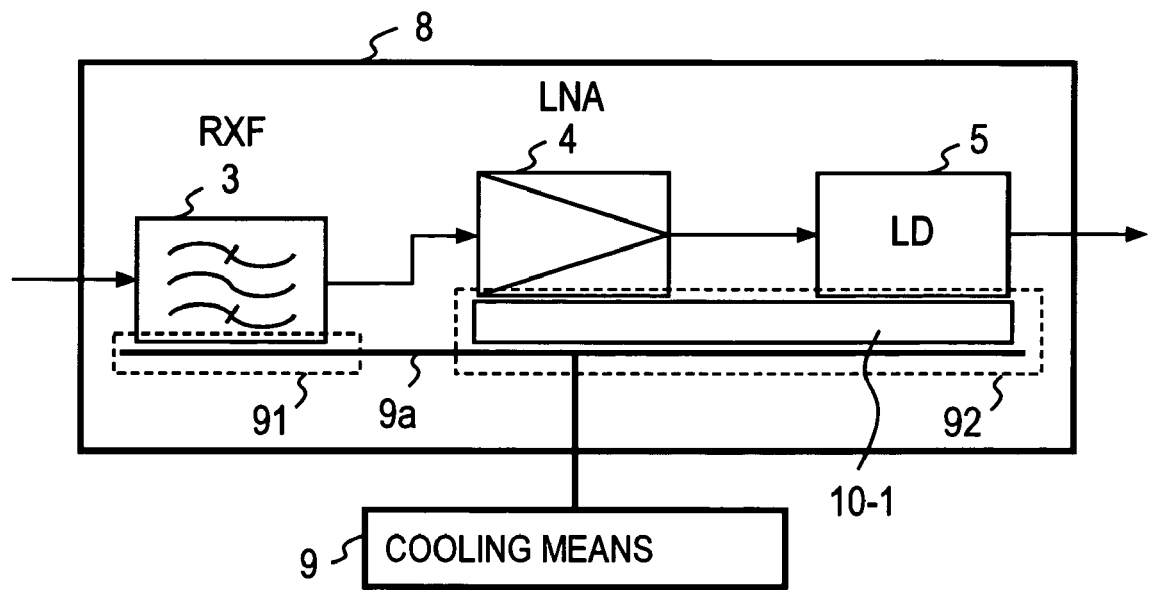
FIG. 10A is a block diagram of an essential part of another embodiment in which a plurality of cooling units are formed by a cooling member and a heat resistance member.
Figure 10B:
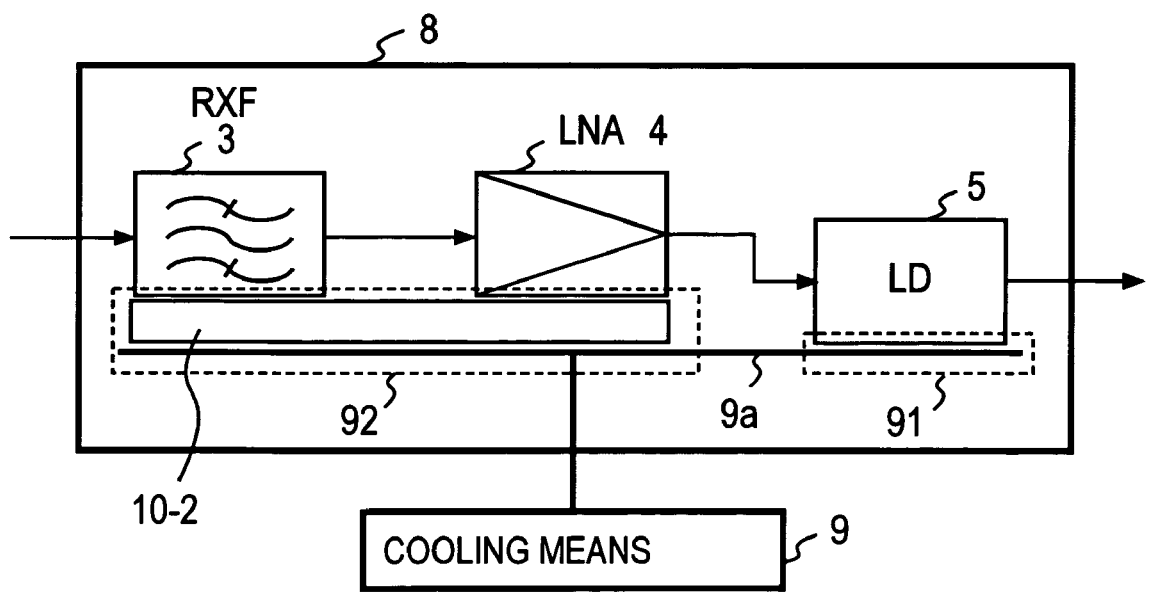
FIG. 10B is a block diagram of an essential part of a further embodiment in which a plurality of cooling units are formed by a cooling member and a heat resistance member.
Figure 10C:
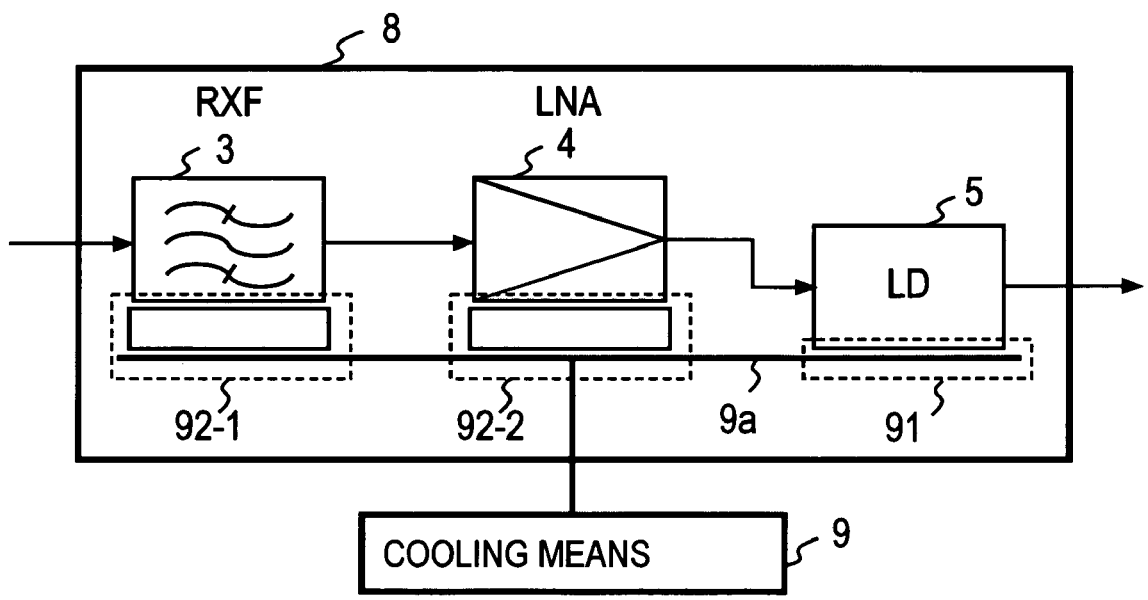
FIG. 10C is a block diagram of an essential part of still another embodiment in which a plurality of cooling units are formed by a cooling member and heat resistance members.
Figure 10D:
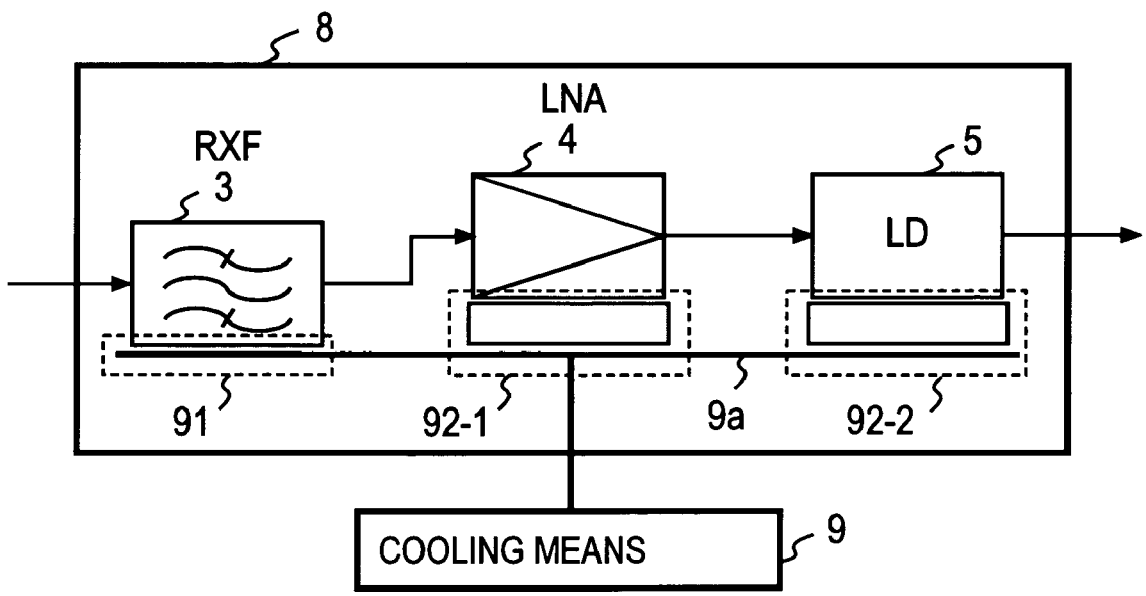
FIG. 10D is a block diagram of an essential part of a still further embodiment in which a plurality of cooling units are formed by a cooling member and heat resistance members.

Other embodiments using cooling means 9 including a plurality of cooling units which use a cooling member 9a and a heat resistance member or members to cool RXF3, LNA4 and LD5 are schematically shown in FIGS. 10A to 10D. In FIG. 10A, the cooling unit 91 cools RXF3 and the cooling unit 92 cools LNA4 and LD5. In FIG. 10B, the cooling unit 91 cools LD5 and the cooling unit 92 cools RXF3 and LNA4. In FIG. 10C, the cooling unit 91 cools LD5, a cooling unit 92-1 cools RXF3 and a cooling unit 92-2 cools LNA4. In FIG. 10D, the cooling unit 91 cools RXF3, the cooling unit 92-1 cools LNA4 and the cooling unit 92-2 cools LD5.

Embodiment 3

Figure 11:
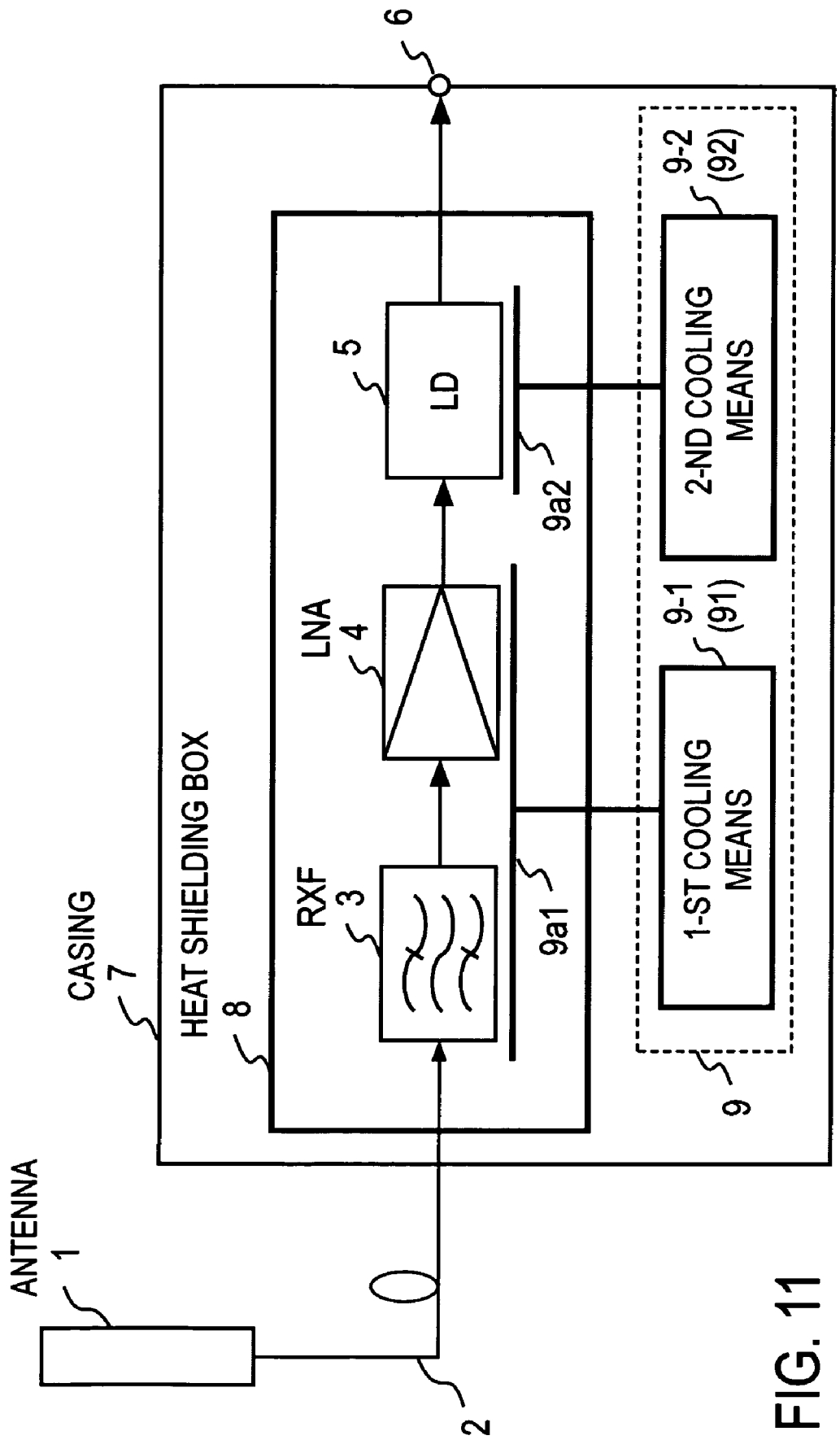
FIG. 11 is a block diagram of an embodiment using a plurality of cooling means.

Embodiment 3 use a plurality of cooling means which are provided as a plurality of cooling units of cooling means 9. This embodiment is shown in FIG. 11.

A distinction of this embodiment over the arrangement shown in FIG. 1 resides in the fact that RXF3 and LNA4 are cooled by first cooling means 9-1 while LD5 is cooled by second cooling means 9-2. Specifically, RXF3 and LNA4 are mounted on the cooling member 9a1 in the first cooling means 9-1 to be cooled and maintained at a first temperature in a stable manner for a prolonged period of time. LD5 is mounted on the cooling member 9a2 of the second cooling means 9-2 to be cooled and is maintained at a second temperature in a stable manner for a prolonged period of time. The purpose of providing the first and the second cooling means 9-1 and 9-2 is to allow the first temperature for RXF3 and the second temperature for LD5 to be independently set up. Cooling means 9-1 and 9-2 form together cooling means 9, which may be regarded as including two cooling units, namely, the cooling unit 91 formed by the cooling means 9-1 and the cooling unit 92 formed by the cooling means 9-2.

Figure 12:
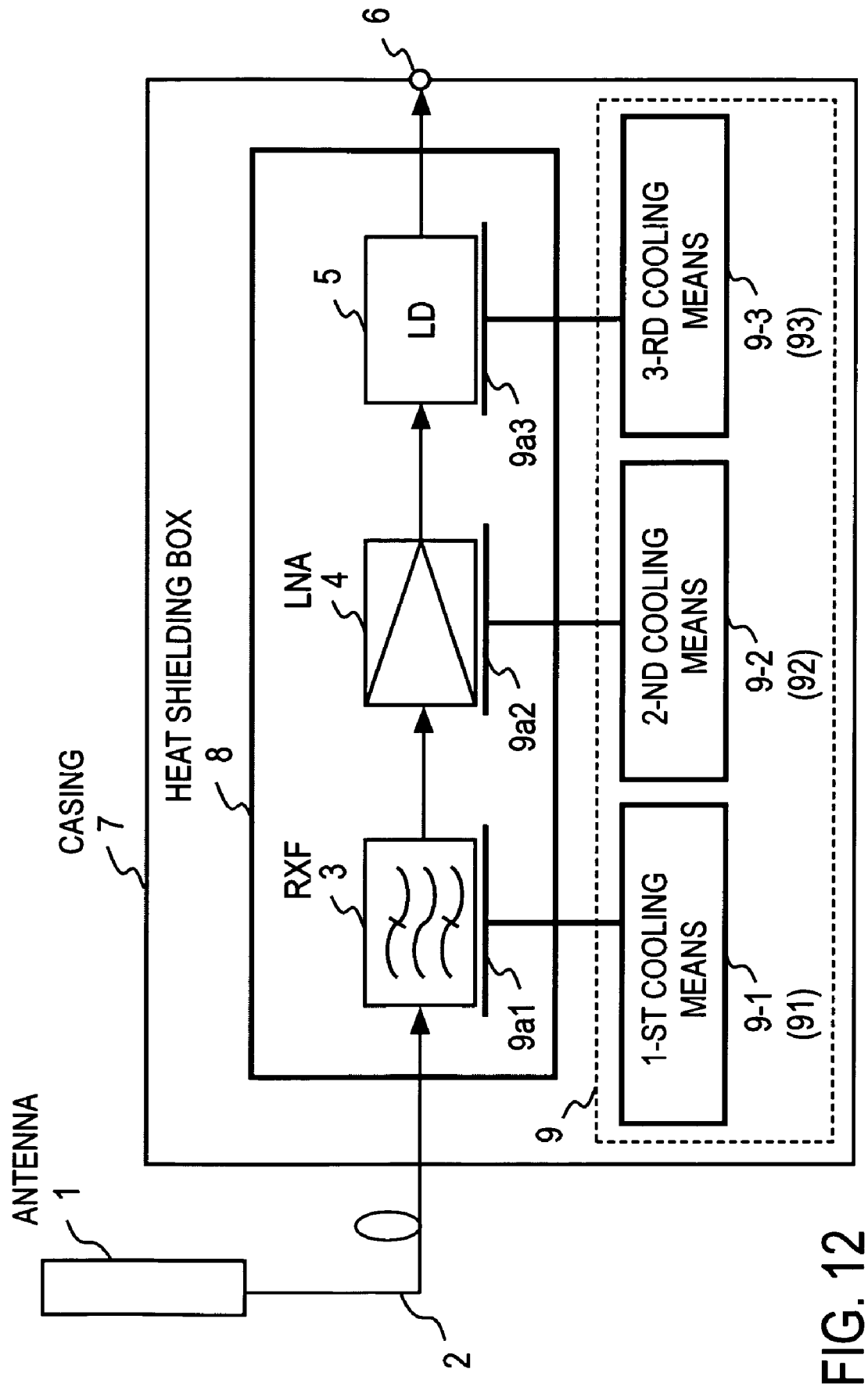
FIG. 12 is a block diagram of an embodiment using a plurality of cooling means.

FIG. 12 shows another embodiment which uses a plurality of cooling means.

In this embodiment, RXF3, LNA4 and LD5 are mounted on a cooling member 9a1 of the first cooling member 9-1, on a cooling member 9a2 of second cooling means 9-2 and on a cooling member 9a3 of third cooling means 9-3, respectively, to be cooled. With this arrangement, RXF3, LNA4 and LD5 are maintained at a first temperature, a second temperature and a third temperature, respectively, in a stable manner for a prolonged period of time. To give examples of the first, the second and the third temperature, the first temperature may be set up at or around 77K for RXF3 which is formed of a higher temperature superconducting material, the second temperature may be set up on the order of several tens K in order to minimize thermal noises generated within LNA4, and the third temperature may be set up at 213KK for LD5 which is illustrated by experimental data shown in FIG. 6.

Figure 13:
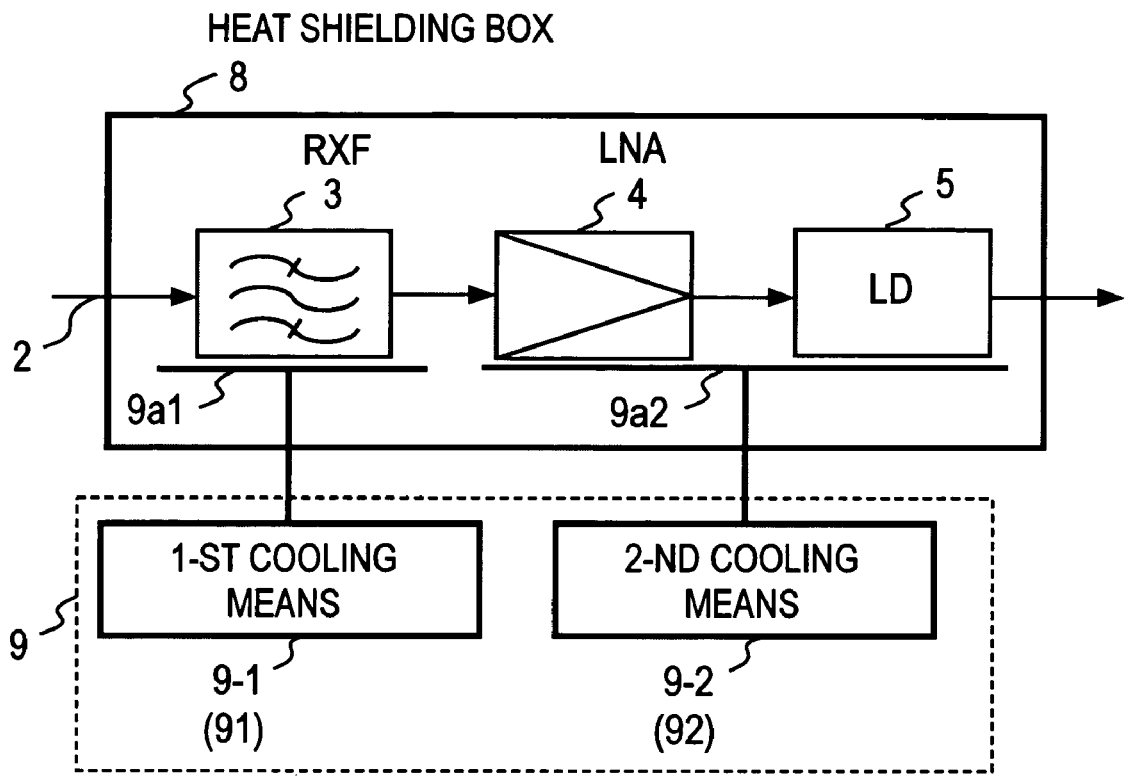
FIG. 13 is a block diagram of an embodiment using a plurality of cooling means.

The first cooling means 9-1, the second cooling means 9-2 and the third cooling means 9-3 form together cooling means 9, which can be regarded as including three cooling units, namely, a cooling unit 91 formed by the first cooling means 9-1, a cooling unit 92 formed by the second cooling means 9-2 and a cooling unit 93 formed by the third cooling means 9-3. Another example of cooling means 9 having cooling units each including cooling means is illustrated in FIG. 13. RXF3 is mounted on a cooling member 9a1 of cooling means 9-1 which serves as a cooling unit 91, and LNA4 and LD5 are mounted on a cooling member 9a2 of cooling means 9-2 which serves as a cooling unit 92.

Embodiment 4

Figure 14:
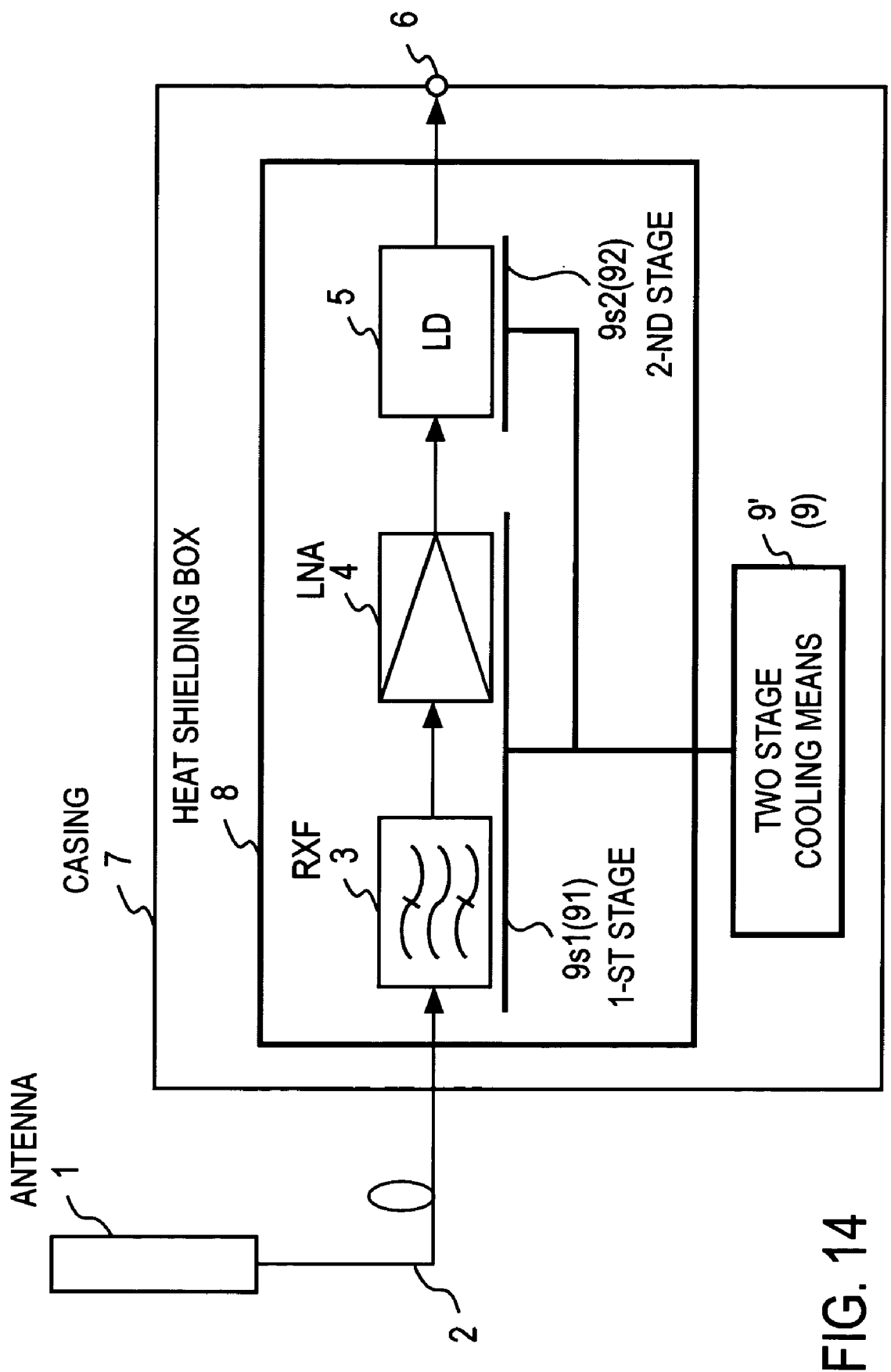
FIG. 14 is a block diagram of an embodiment in which a plurality of cooling units are formed by cooling means having a plurality of members.

Embodiment 4 illustrates cooling means 9 having a plurality of cooling units, which are served by each member of cooling means having a plurality of members. This embodiment is shown in FIG. 14.

A distinction of this embodiment over the arrangement shown in FIG. 5 resides in the use of a two member cooling means 9' to serve as cooling means 9. RXF3 and LNA4 are mounted on a first cooling member 9s1 of the two member cooling means 9' to be cooled thereby and LD5 is mounted on the second cooling member 9s2 of the two member cooling means 9' to be cooled thereby. The two member cooling means 9' have the first cooling member 9s1 and the second cooling member 9s2, the temperature of which can be independently set up. Cooling members having cooling temperatures which can be independently set up are hereafter referred to as "stages". A commercial product is available for the two member cooling means 9'. RXF3 and LNA4 is maintained at a first temperature, which is set up for the first stage 9s1, in a stable manner for a prolonged period of time. LD5 is maintained at a second temperature, which is set up for the second stage 9s2, in a stable manner for a prolonged period of time.

Figure 15:
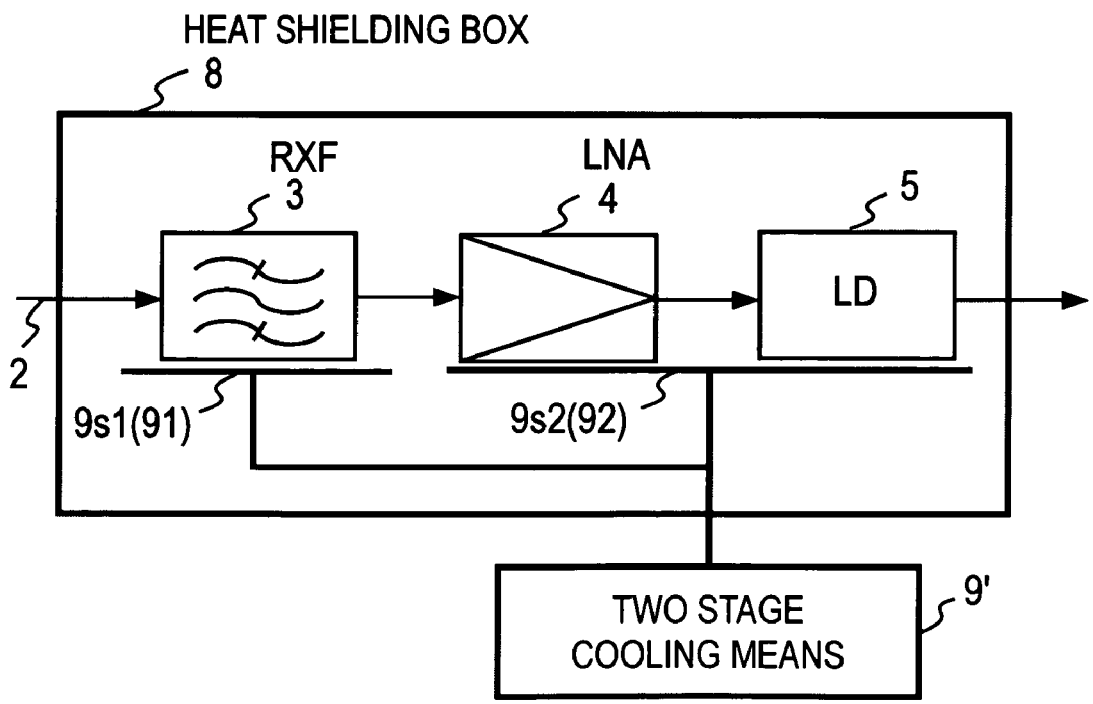
FIG. 15 is a block diagram of an embodiment in which a plurality of cooling units is formed by cooling means having a plurality of members.

As shown in FIG. 15, only RXF3 may be mounted on the first stage 9s1, and LNA4 and LD5 may be both mounted on the second stage 9s2.

It will be seen that the first stage 9s1 and the second stage 9s2 form cooling units 91 and 92 of the cooling means 9.

Figure 16:
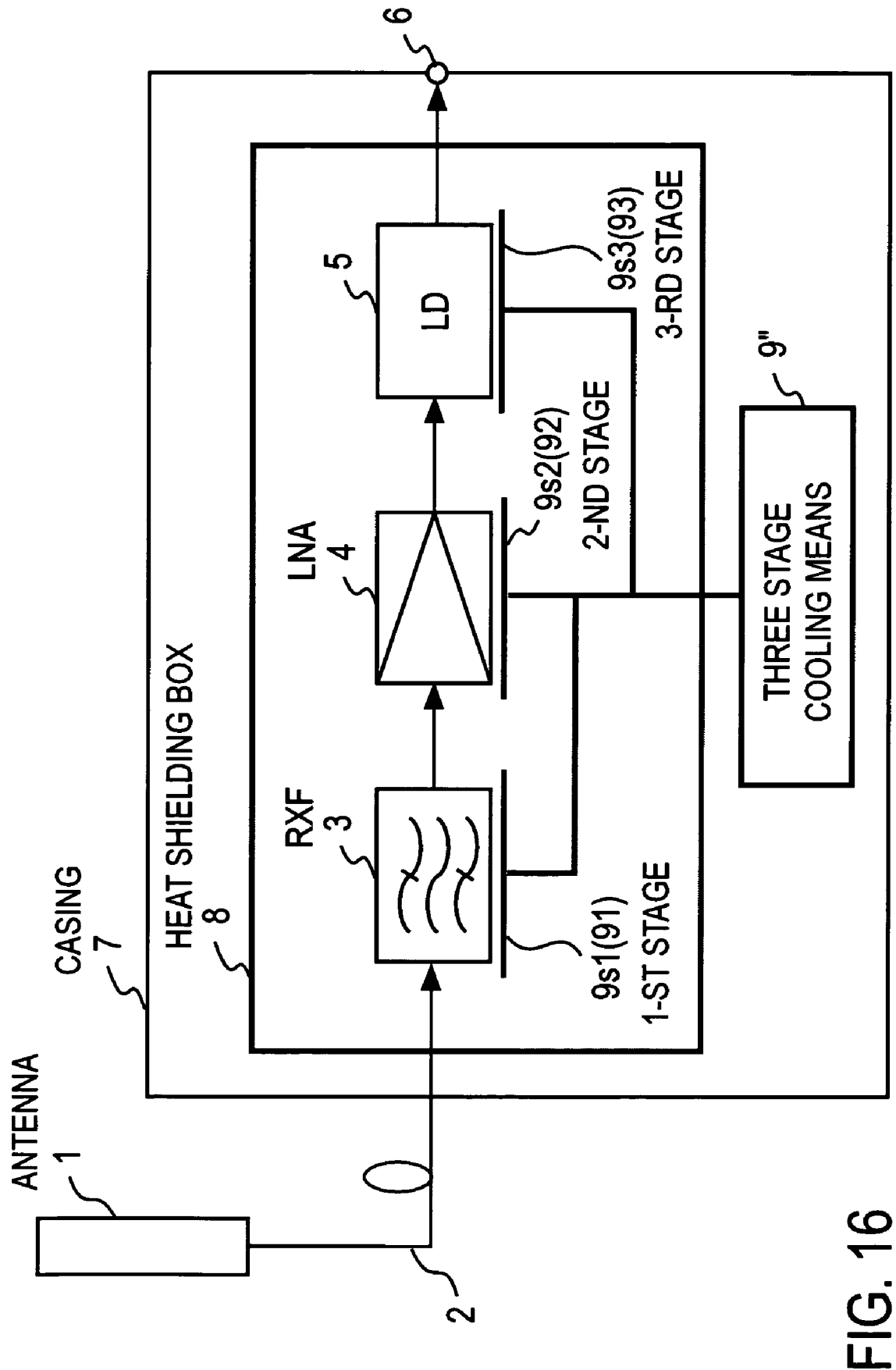
FIG. 16 is a block diagram of an embodiment in which a plurality of cooling units are formed by cooling means having a plurality of members.

FIG. 16 shows another embodiment using cooling means having a plurality of members.

A distinction of this embodiment over the arrangement shown in FIG. 15 resides in the use of a three member cooling means 9" for the cooling means 9. RXF3, LNA4 and LD5 are mounted on a first stage 9s1, a second stage 9s2 and a third stage 9s3, respectively, of the three member cooling means 9". In the three member cooling means 9", the temperatures of the three members can be independently set up. RXF3, LNA4 and LD5 are maintained at a first, a second and a third temperature, which are set up for the first, the second and the third stage 9s1, 9s2 and 9s3, respectively, in a stable manner for a prolonged period of time. To give examples of the first, the second and the third temperature, the first temperature may be set up at or around 77K for RXF3 which is formed of a higher temperature superconducting material, the second temperature may be set up on the order of several tens K in order to minimize thermal noises generated within LNA4, and the third temperature may be set up at 213K for LD5 which is illustrated by experimental data shown in FIG. 6.

Figure 28A:
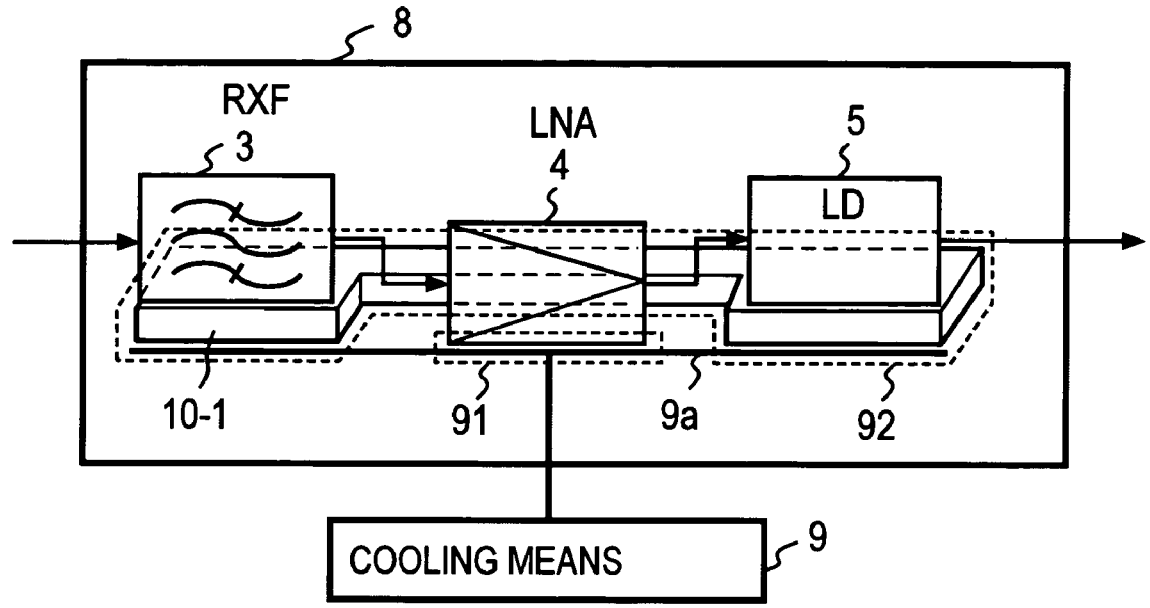
FIG. 28A is a block diagram of a modification of Embodiment 2.
Figure 28B:
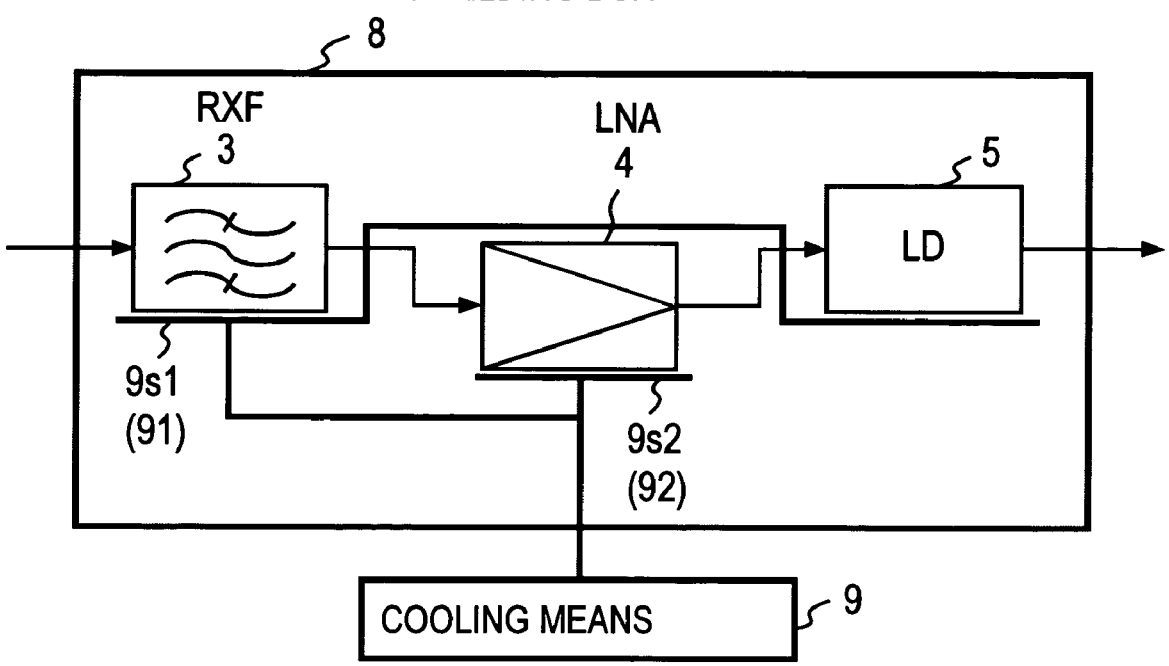
FIG. 28B is a block diagram of a modification of Embodiment 4.

These devices may be divided in two groups, one including RXF3 and LD5 and the other including LNA4, and one group may be cooled by cooling unit 91 while the other group may be cooled by the cooling unit 92. Where a heat resistance member is used, LNA4 may be directly mounted on a cooling member 9a to be cooled by the cooling unit 91 while RXF3 and LD5 may be mounted on the cooling member 9a through an interposed heat resistance member 10-1 to be cooled by the cooling unit 92, as schematically shown in FIG. 28A conversely, RXF3 and LD5 may be directly mounted on the cooling member 9a while LNA4 may be mounted on the cooling member 9a through the interposed heat resistance member 10-1. Where the two member cooling means 9' is used, RXF3 and LD5 may be cooled by a cooling unit 91 which comprises a first stage 9s1 while LNA4 may be cooled by a cooling unit 92 which comprises a second stage 9s2. Conversely, LNA4 may be cooled by the first stage 9s1 while RXF3 and LD5 may be cooled by the second stage 9s2. The same applies when the first cooling means 13 and the second cooling means 14 are used. In sum, as will be understood from the embodiments shown in FIGS. 5, 7 to 16, 28A and 28B, RXF3, LNA4 and LD5 may be divided in to s groups, which may be cooled by s cooling units where s represents one of 1, 2 and 3.

Emobodiment 5

Embodiment 5 illustrates the application of the present invention to a high sensitivity receiver including an array antenna.

Figure 17:
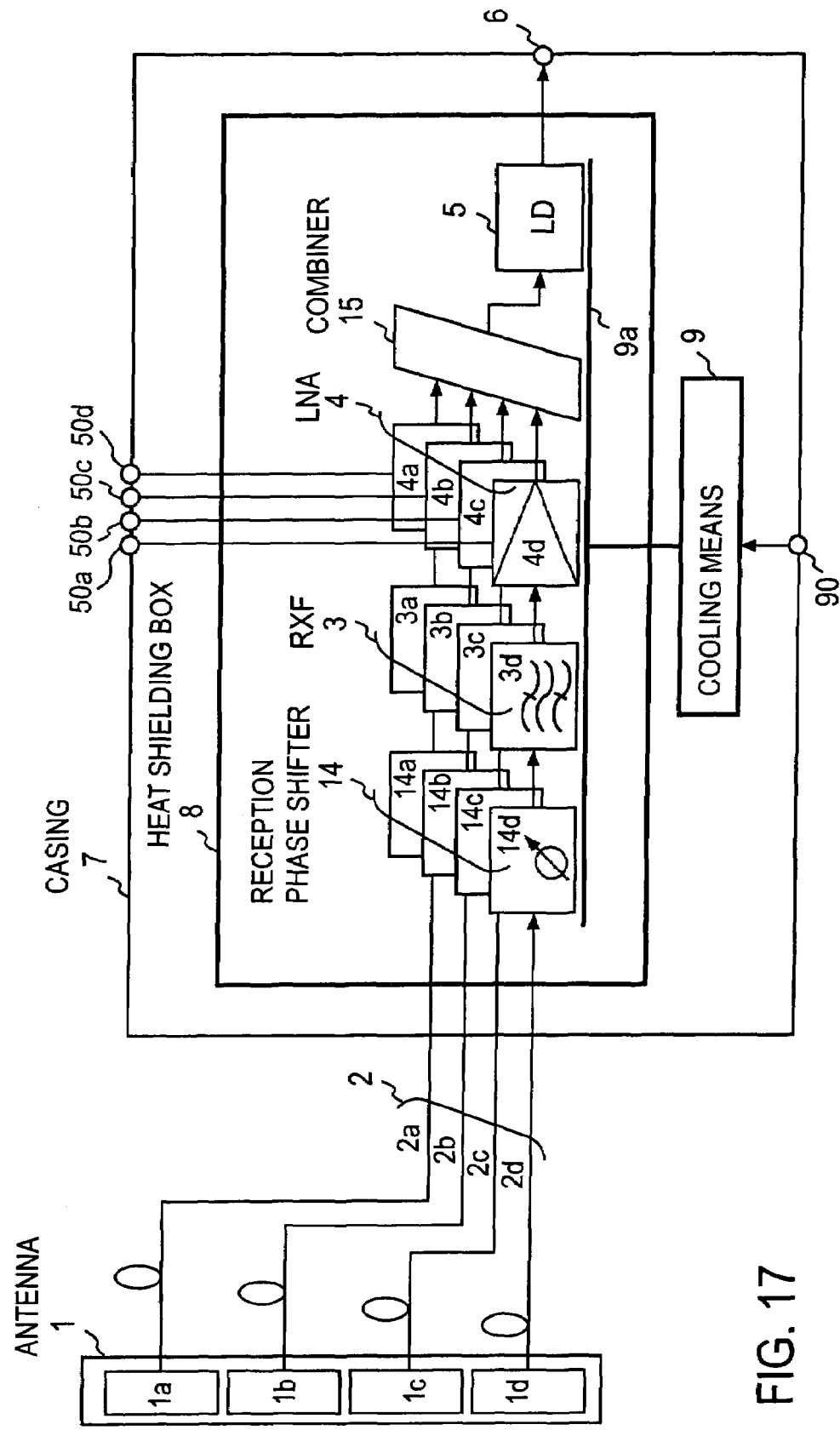
FIG. 17 is a block diagram of an embodiment illustrating the application of the embodiment shown in FIG. 5 to an array antenna high sensitivity receiver.

FIG. 17 shows an embodiment illustrating the application of the embodiment 1 to an array antenna high sensitivity radio receiver.

Figure 2:
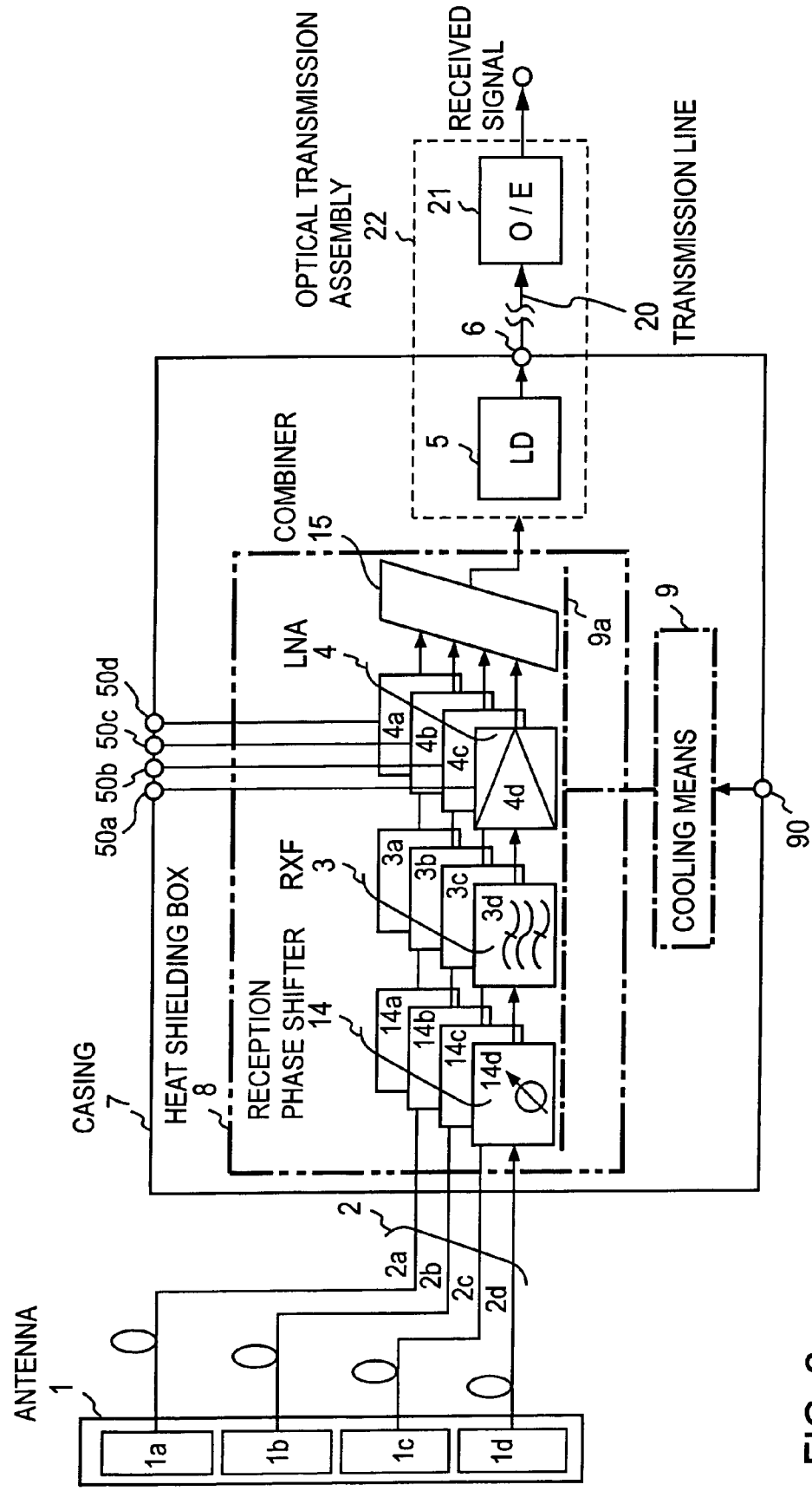
FIG. 2 is a block diagram of an exemplary functional arrangement of a conventional array antenna high sensitivity receiver.
Figure 3:
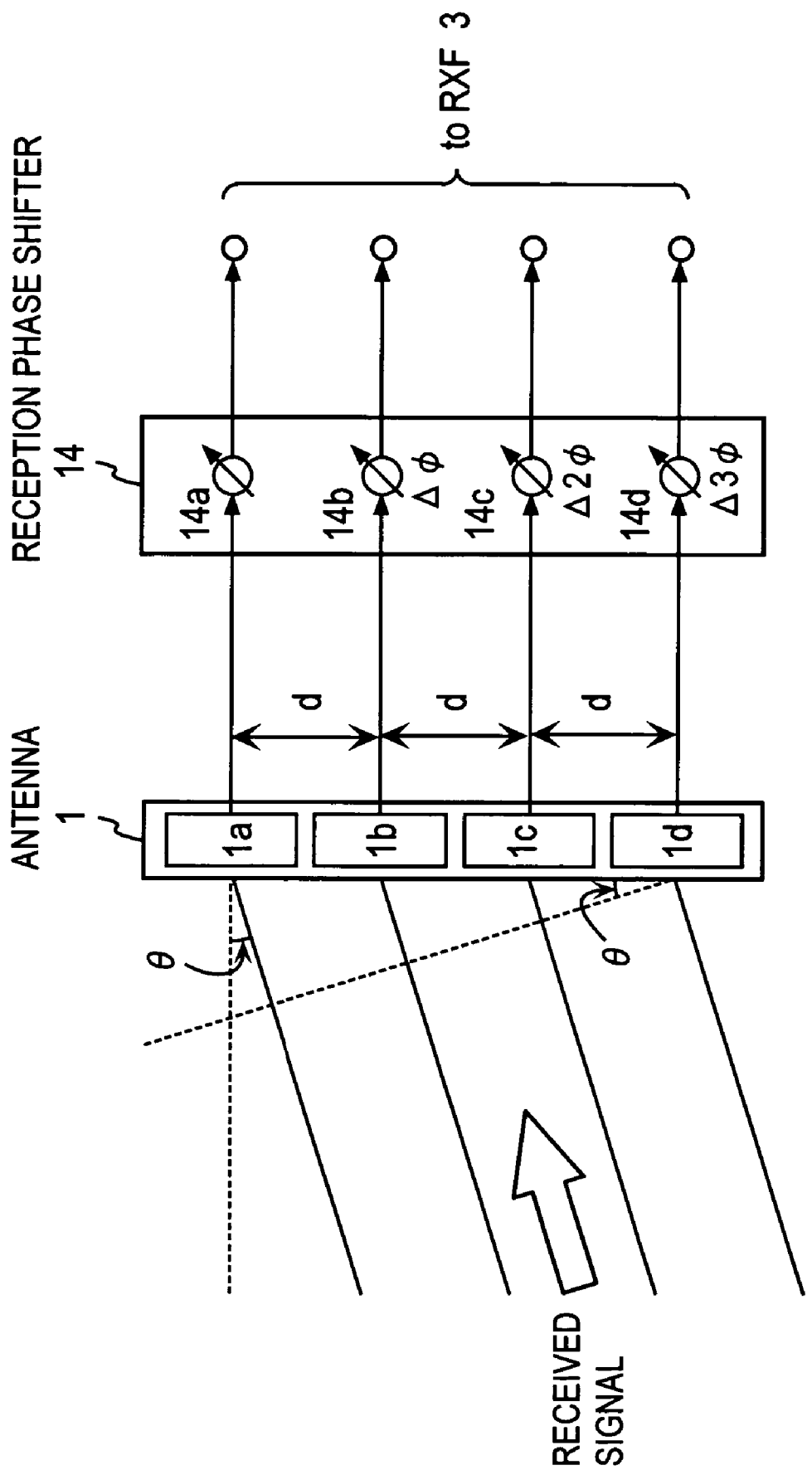
FIG. 3 is a schematic illustration of the functioning of a reception phase shifter 14 shown in FIG. 2.
Figure 4:
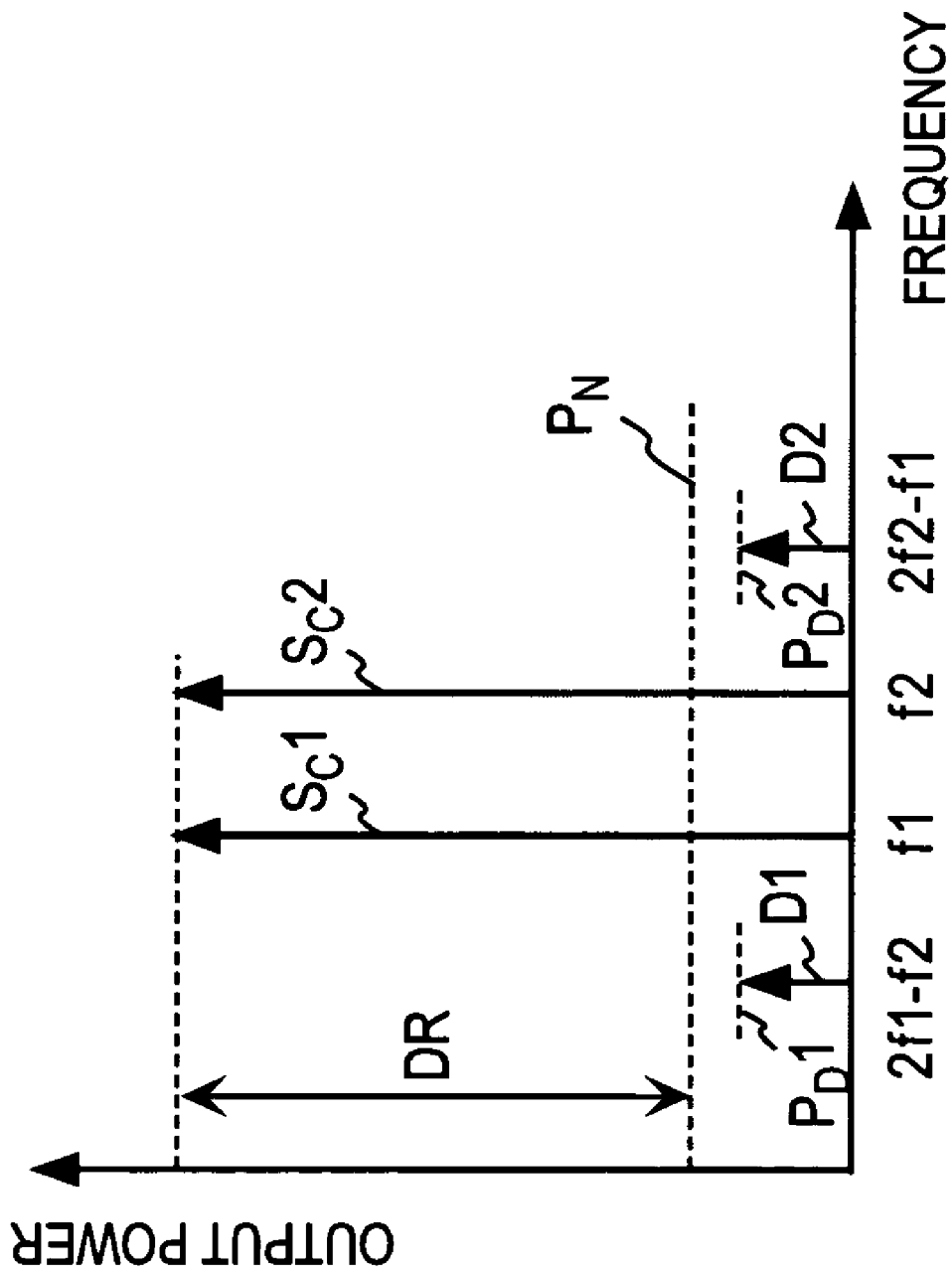
FIG. 4 is an illustration to describe the dynamic range DR.

An antenna 1 is formed by four antenna elements 1a to 1d, in the similar manner as in the conventional receiver shown in FIG. 2. However, a reception phase shifter 14, RXF3, LNA4, a combiner 15 and LD5 which are constructed in the similar manner as shown in FIG. 2 are confined in this embodiment in a heat shielding box 8 which is provided with vacuum heat insulation to interrupt the heat flow from the outside into the box, and are cooled by cooling means 9 which is capable of maintaining a very low temperature, which may be several tens K, for example, in a stable manner for a prolonged period of time. Thus, in this embodiment, cooling means 9 which is similar to that described in connection with the embodiment shown in FIG. 5 is used, and the reception phase shifter 14, RXF3, LNA4, the combiner 15 and LD5 are mounted on the cooling member 9a of the cooling means 9, and thus is cooled by a single cooling unit.

When the reception phase shifter 14, RXF3, LNA4, the combiner 15 and LD5 are cooled to cryogenic temperature in a stable manner for a prolonged period of time, thermal noises which may be generated within these devices may be minimized and since the reception phase shifter 14 and RXF3 assume a superconducting state, their insertion loss can be minimized. As a consequence, the noise figure of the array antenna high sensitivity radio receiver is significantly improved as is the reception sensitivity. Thus, when this high sensitivity receiver is used, a received output with a prescribed C/N ratio can be obtained from a low level received signal, and a transmitting power on the transmitting side which is required to obtain a received output having a prescribed C/N ratio can be reduced. In addition, when the heat shielding box 8 is evacuated, a frosting on LD5 as a result of the sublimation of a water vapor in the air can be prevented when LD5 is cooled to a cryogenic temperature.

Figure 18:
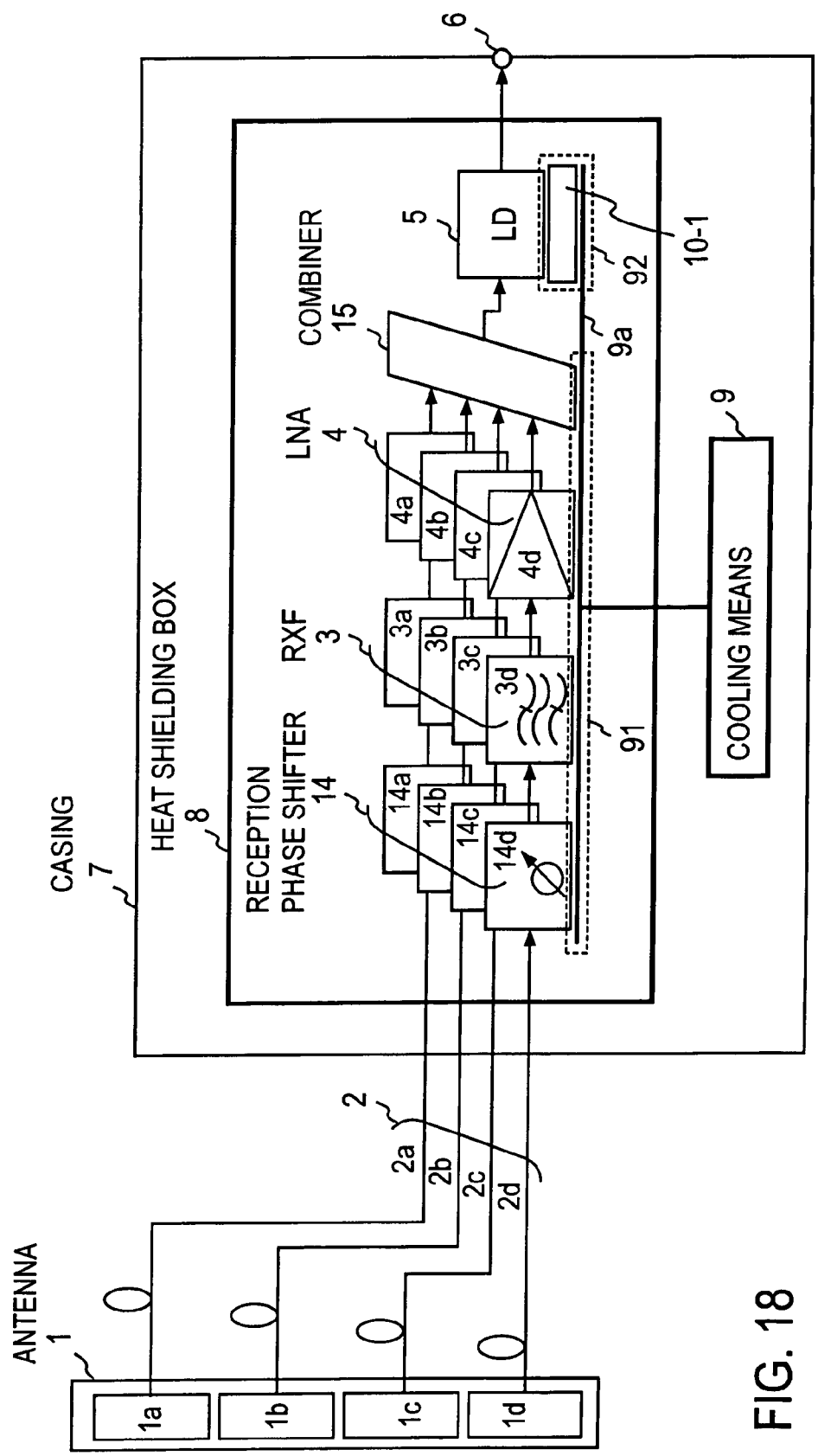
FIG. 18 is a block diagram of an embodiment illustrating the application of the embodiment shown in FIG. 7 to an array antenna high sensitivity receiver.

FIG. 18 shows another embodiment in which the cooling means 9 for the array antenna high sensitivity receiver is constructed in the similar manner as illustrated in FIG. 7 using a heat resistance member. Thus, a distinction of this embodiment over the arrangement shown in FIG. 17 resides in the fact that the reception phase shifter 14, RXF3, LNA4 and the combiner 15 are directly cooled by a cooling member 9a to a first temperature while LD5 is cooled to a second temperature through the cooling member 9a and a heat resistance member 10-1.

The use of the heat resistance member 10-1 provides a temperature offset required between the first and the second temperature. When RXF3 is formed of a superconducting material, for example, the first temperature is set up at a point equal to or below the critical temperature of RXF3. At this temperature, RXF3 assumes a superconducting state, and accordingly, if multiple stages of resonators are used to construct RXF3, the loss is reduced, and a steep attenuation response can be obtained while simultaneously minimizing thermal noises. When the superconducting material comprises a higher temperature superconducting material, the critical temperature may exceed 100K, and the intended temperature may be set up at or around 77.4K which is the boiling point of liquid nitrogen, for example.

On the other hand, the second temperature is designed to operate LD5 with a preferred electrical response. For example, with experimental data illustrated in FIG. 6, the dynamic range DR of LD5 is maximized at temperature of 213K. As compared with DR which prevails at normal temperature, for example, 298K (25° C.), DR at the temperature of 213K is improved by 7 dB. According to the equation (1), this improvement is effective to multiply m, the number of multiplexible channels, of the optical transmission assembly 22 by a factor of 11.2. By way of example, when m of the optical transmission assembly 22 at 298K is assumed to be thirty two waves, the m value at 213K will be three hundred and sixty waves. Accordingly, the second temperature for LD5 is set up at 213K in order to maximize m of optical transmission assembly 22.

The temperature which is preferred for LD5 may be different from the temperature which is preferred for the reception phase shifter 14, RXF3, LNA4 and the combiner 15 as mentioned above. Accordingly, in this embodiment, a condition in which the reception phase shifter 14, RXF3, LNA4 and the combiner 15 are stabilized at the first temperature is implemented by the cooling means 9 while a condition in which LD5 is stabilized at the second temperature which is higher than the first temperature is implemented by interposing the heat resistance 10-1 between LD5 and the cooling member 9a. In this instance, a required offset between the first and the second temperature can be realized by a suitable choice of the thermal conductivity and the configuration of the member which constitutes the heat resistance member 10-1. The present embodiment can be considered such that the devices are separated into two groups, one including the reception phase shifter 14, RXF3, LNA4 and the combiner 15 and the other including LD5, the first group being cooled by the cooling unit 91 while the second group is cooled by the cooling unit 92.

Figure 19:
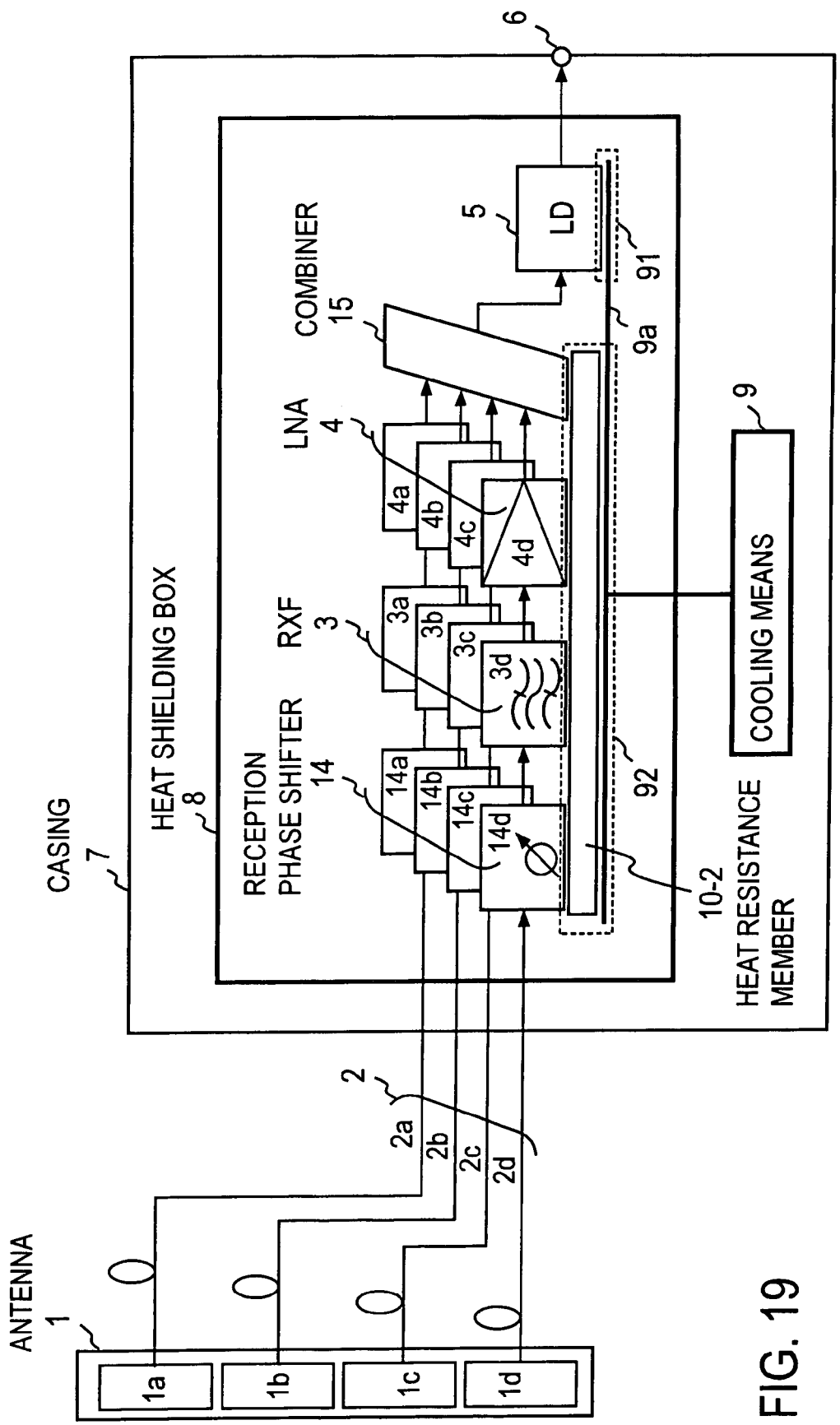
FIG. 19 is a block diagram of an embodiment illustrating the application of the embodiment shown in FIG. 10B to an array antenna high sensitivity receiver.

FIG. 19 shows an embodiment in which cooling means 9 for the array antenna high sensitivity receiver is constructed in the similar manner as shown in FIG. 10B.

A distinction of this embodiment over the arrangement shown in FIG. 17 resides in the fact that LD5 is directly cooled to a second temperature by a cooling member 9a (cooling unit 91) while the reception phase shifter 14, RXF3, LNA4 and the combiner 15 are cooled to a first temperature which is higher than the second temperature by the cooling unit 92 or through a heat resistance member 10-2.

Figure 20:
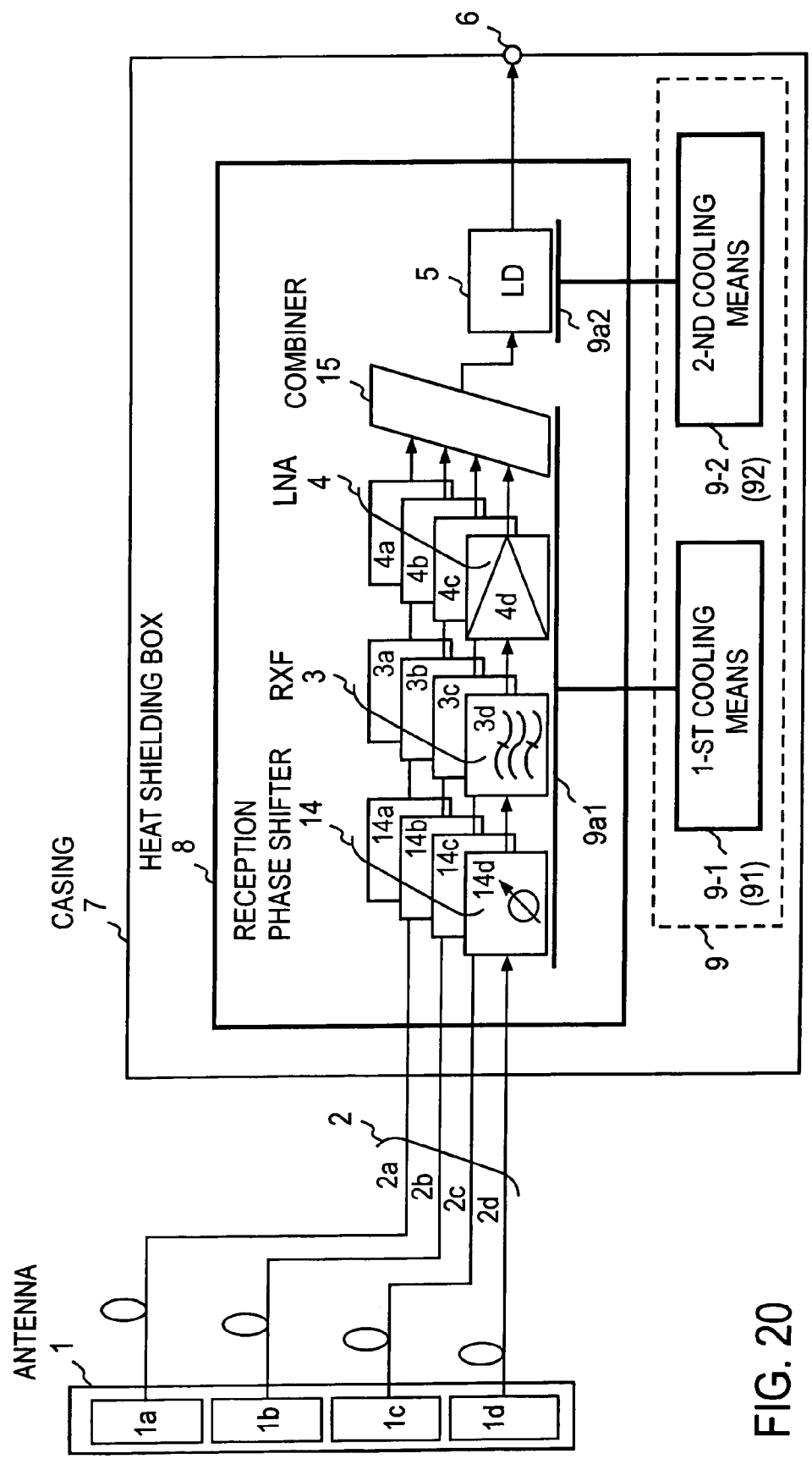
FIG. 20 is a block diagram of an embodiment illustrating the application of the embodiment shown in FIG. 11 to an array antenna high sensitivity receiver.

FIG. 20 shows an embodiment in which cooling means 9 for the array antenna high sensitivity receiver is constructed in the similar manner as shown in FIG. 11 using a plurality of cooling means.

A distinction of this embodiment over the arrangement shown in FIG. 18 resides in the fact that the reception phase shifter 14, RXF3, LNA4 and combiner 15 are inclusively cooled to a first temperature by first cooling means 9-1 while LD5 is cooled to a second temperature by second cooling means 9-2.

Figure 21:
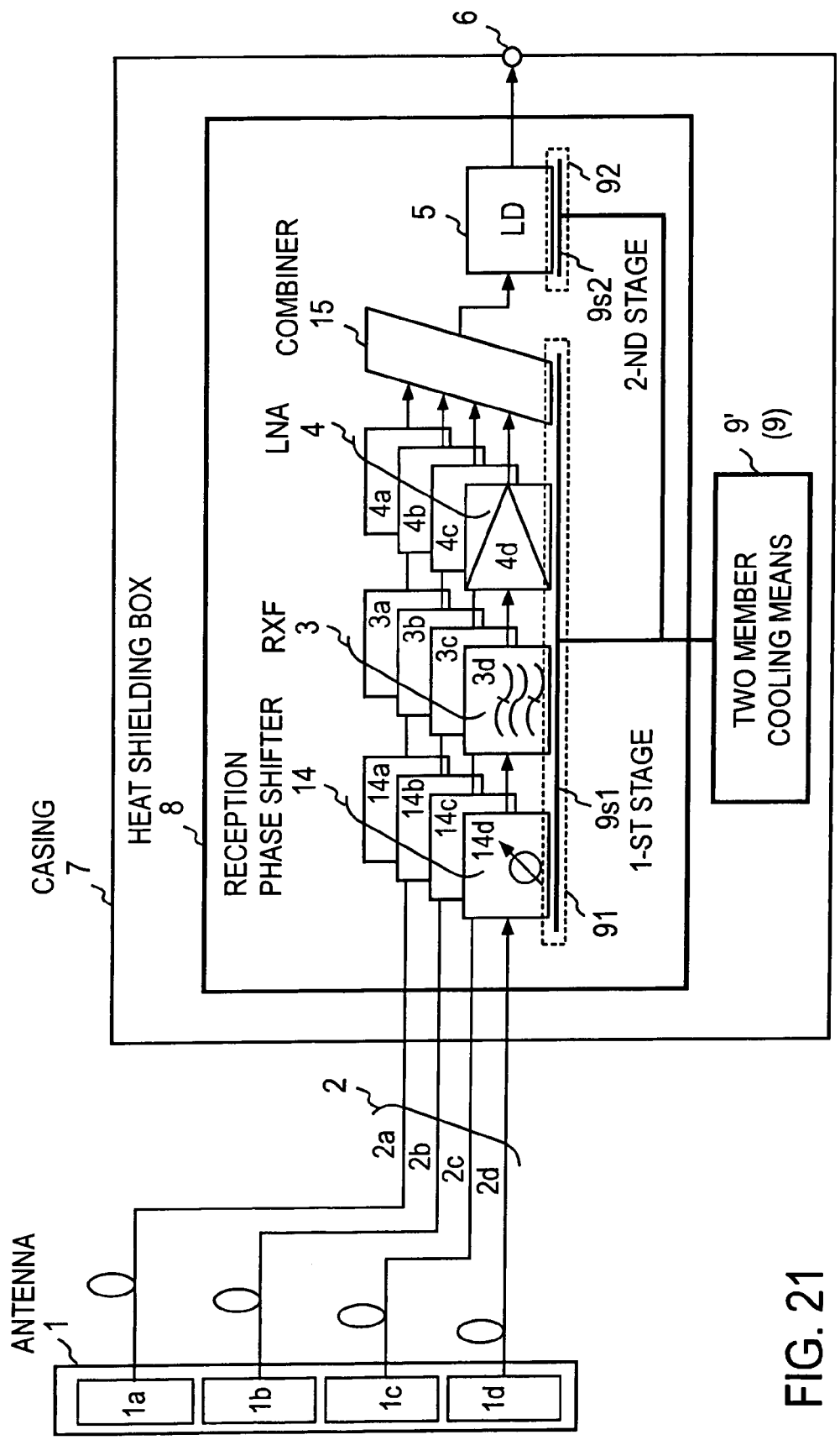
FIG. 21 is a block diagram of an embodiment illustrating the application of the embodiment shown in FIG. 14 to an array antenna high sensitivity receiver.

FIG. 21 shows an embodiment in which cooling means 9 of the array antenna high sensitivity receiver is constructed in the similar manner as shown in FIG. 14 using cooling means including a plurality of members.

A distinction of this embodiment over the arrangement shown in FIG. 20 resides in the use of two member cooling means 9'. Specifically, the reception phase shifter 14, RXF3, LNA4 and the combiner 15 are inclusively mounted on a first stage 9s1 of the two member cooling means 9' while LD5 is mounted on a second stage 9s2 of the two member cooling means 9' to be cooled to a second temperature.

Various forms of the cooling means 9 for the array antenna high sensitivity receiver have been shown, including an example in which a heat resistance member is used to define a plurality of cooling units 91, 92, another example in which a plurality of cooling means are used to define a plurality of cooling units 91, 92, and a further example in which cooling means having a plurality of members is used to define a plurality of cooling units 91, 92. Cooling the reception phase shifter 14 and RXF3 on one hand and LNA4, the combiner 15 and LD5 on the other hand to mutually different temperatures using cooling means 9 which includes a plurality of cooling units 91 and 92 or 91, 92 and 93 which are constructed using various techniques without being limited to the examples shown above can be implemented in the similar manner as in the embodiments shown in FIGS. 8, 10A, 13 and 15. Alternatively, cooling the combination of the reception phase shifter 14 and RXF3, the combination of LNA4 and the combiner 15 and LD5 to mutually different temperatures is also possible in the similar manner as in the embodiments shown in FIGS. 9, 10C, 10D, 12 and 16. Generally stated, the reception phase shifter 14, RXF3, LNA4, the combiner 15 and LD5 may be divided into two groups, which are cooled by different cooling units, or may be divided into three groups which are cooled by three cooling units or divided into four groups, which are cooled by four cooling units, or divided into five sections, which are individually cooled by five cooling units. In sum, in these embodiments and the embodiment shown in FIG. 17, devices on the signal path which are contained within the heat shielding box 8, namely, the reception phase shifter 14, RXF3, LNA4, the combiner 15 and LD5 may be divided into s groups, which may be cooled by s cooling units where s is one of 1, 2, 3, 4 and 5, inclusive of an instance where these devices are separately cooled. A device within the heat shielding box 8 as termed herein refers to such device.

Figure 29:
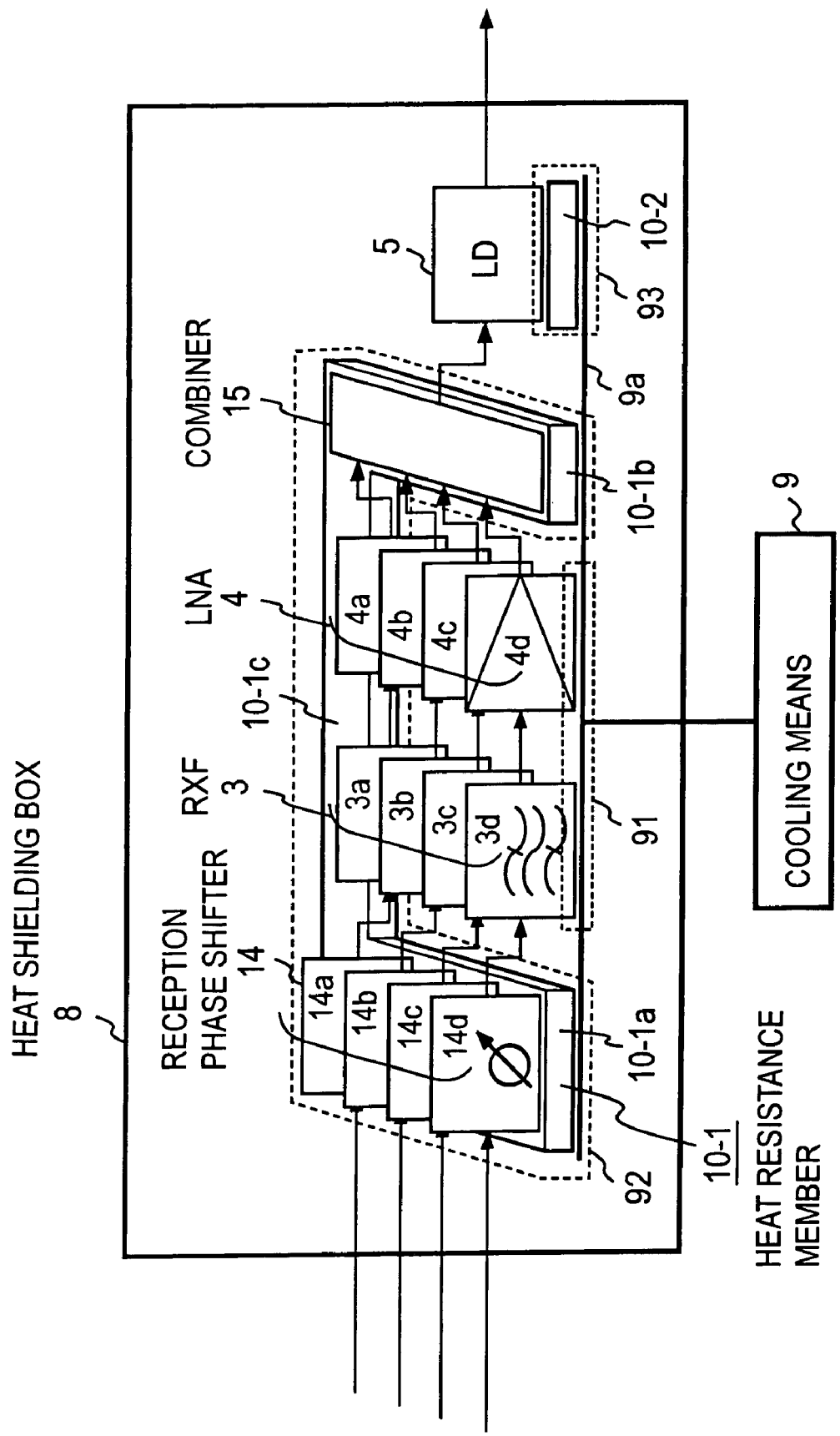
FIG. 29 is a block diagram of an embodiment in which devices are divided into three groups to be cooled in Embodiment 5.

By way of example, FIG. 29 schematically shows an example using heat resistance members to cooled devices within the heat shielding box 8 in three groups. The reception phase shifter 14 and the combiner 15 are mounted on a cooling member 9a through a heat resistance member 10-1 to be cooled by a cooling unit 92, RXF3 and LNA4 are directly mounted on the cooling member 9a to be cooled by a cooling unit 91, and LD5 is mounted on the cooling member 9a through an interposed heat resistance member 10-2 to be cooled by a cooling unit 93. The heat resistance member 10-1 comprises a heat resistance section 10-1a on which the reception phase shifter 14 is mounted, a heater resistance section 10-1b on which the combiner 15 is mounted, and a heat resistance section 10-ic which connects between the both heat resistance sections 10-1a and 1b, and which are integrally formed together. In this manner, a combination of the reception phase shifter 14 and the combiner 15, a combination of RXF3 and LNA4 and LD5 can be cooled to temperatures which are different from each other. It will be readily understood that where the devices are divided into other combinations or groups, the arrangement shown above is applicable not only to an arrangement in which a plurality of cooling units are formed by using a heat resistant member or members, but also to an arrangement where the plurality of cooling units are formed by a plurality of cooling members or where they are formed by a plurality of cooling means.

Figure 22:
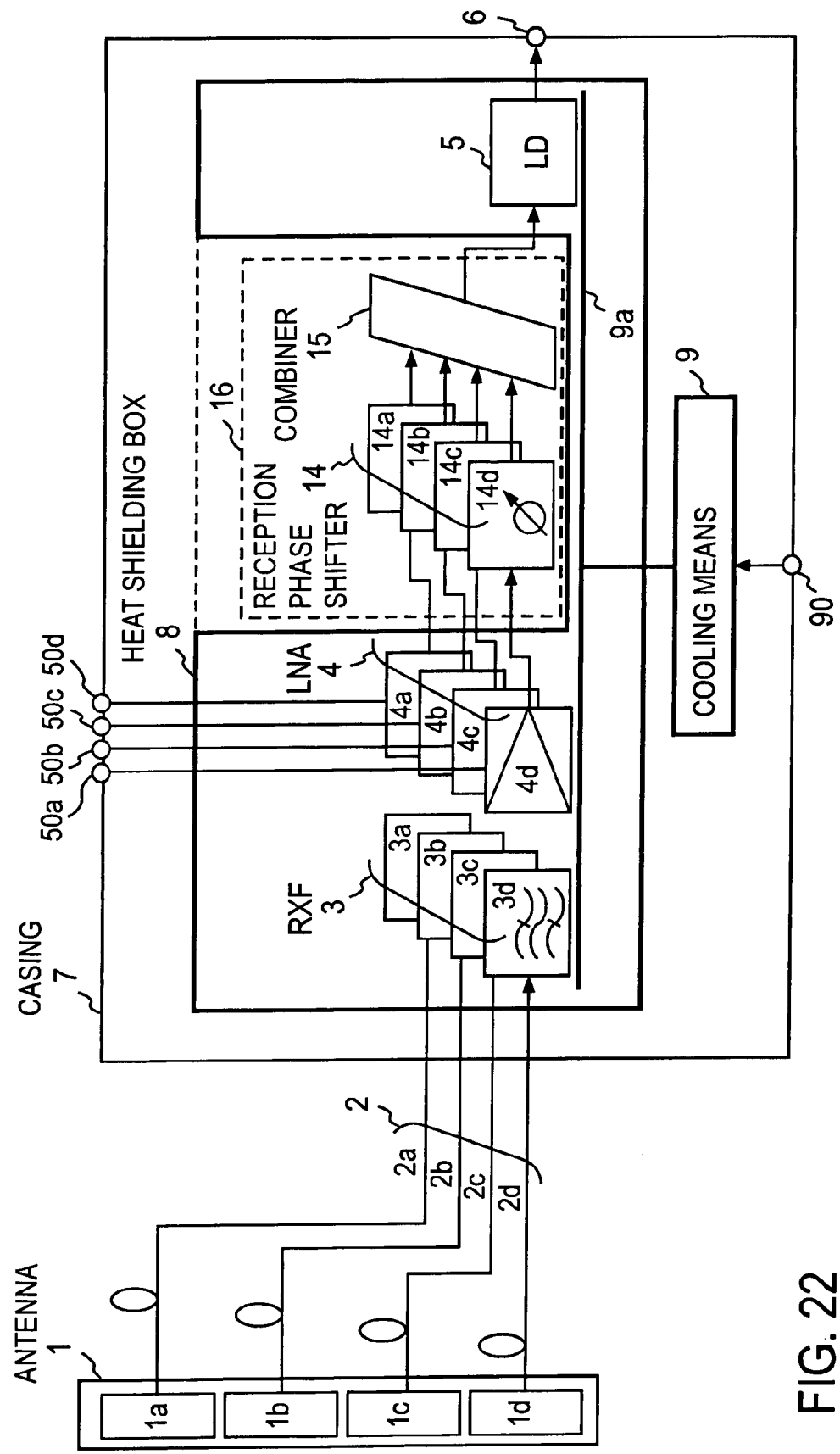
FIG. 22 is a block diagram of another embodiment of an array antenna high sensitivity receiver.

FIG. 22 shows another embodiment of an array antenna high sensitivity receiver.

As compared with the arrangement shown in FIG. 17, a distinction of this embodiment resides in the fact that received signals from antenna elements 1a, 1b, 1c and 1d are input to RXF3 (3a, 3b, 3c and 3d), and outputs from 3a, 3b, 3c, and 3d are amplified in four amplifiers (4a, 4b, 4c, 4d) of LNA4, and the amplified signals are subject to an adjustment for phase differences between them in four phase shifter circuits 14a, 14b, 14c and 14d of the reception phase shifter 14 so as to assume an identical phase before they are combined in the combiner 15, and the combined output signal is delivered to LD, it being noted that the reception phase shifter 14 and the combiner 15 are disposed outside the heat shielding box 8.

RXF3 and LNA4 are maintained at a cryogenic temperature by the cooling means 9, and accordingly, the phase response of RXF3 and LNA4 do not vary. Accordingly, the phase shifter 14 may be located subsequent to LNA4. When the reception phase shifter 14 and the combiner 15 are disposed outside the heat shielding box 8, the thermal load on the cooling means 9 can be reduced. However, as indicated by dotted lines in FIG. 22, an arrangement where thermal noises which are generated within the reception phase shifter 14 and the combiner 15 may be reduced may be used to achieve a further improvement in the reception sensitivity.

In the embodiments shown in FIGS. 17 to 22, the reception phase shifter 14 comprises four phase shifter circuits 14a, 14b, 14c and 14d, but because what is required of the reception phase shifter 14 is to deliver the received signals from the four antenna elements with an equal phase, one of the phase shifter circuits 14a, 14b, 14c and 14d may be omitted. Generally, where there are a number of antenna elements which is equal n, the reception phase shifter 14 may have a number of phase shifter circuits which is equal to n or (n−1).

Figure 23:
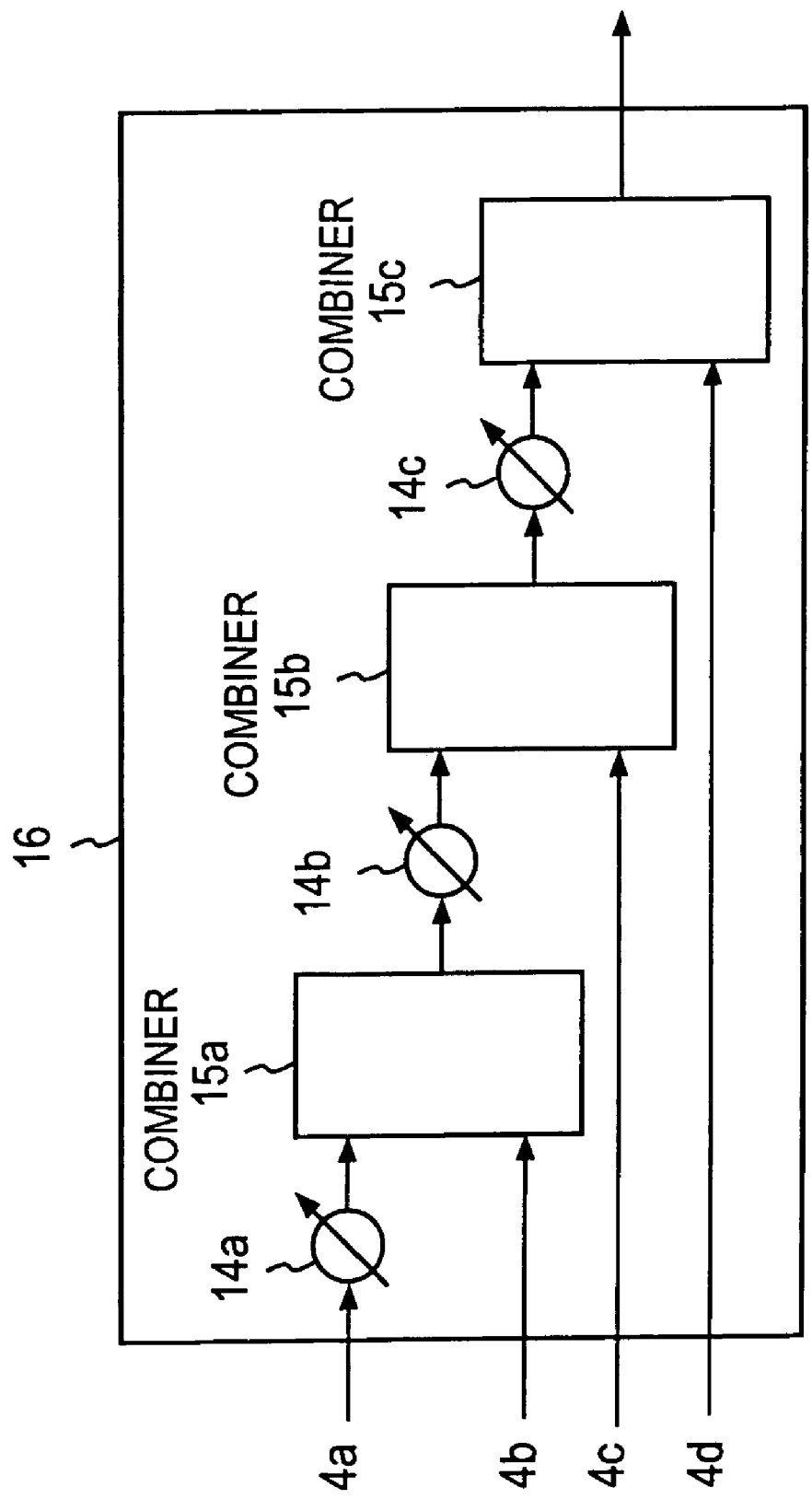
FIG. 23 is a block diagram showing another example of phase shift combiner 16 shown in FIG. 22.

In the embodiment shown in FIG. 22, the reception phase shifter 14 and the combiner 15 forms in combination a phase shifter combiner 16 which performs a phase adjustment and combining. However, a phase shifter combiner 16 may be constructed as shown in FIG. 23, for example. Specifically, an output signal from the amplifier 4a of LNA4 is input to a phase shifter circuit 14a, and an output signal therefrom and an output signal from the amplifier 4b are combined in a combiner 15a. Then an output signal from the combiner 15a is input to a phase shifter circuit 14b and an output signal therefrom and an output signal from the amplifier 4c are synthesized in a combiner 15b. An output signal from the combiner 15b is input to a phase shifter circuit 14c, and an output signal therefrom and an output signal from the amplifier 4d are combined in a combiner 15c to be delivered to LD5. Other arrangement as exemplified in FIG. 2 of the drawings of the cited U.S. Patent may also be used for the phase shifter combiner 16. In the embodiment shown in FIG. 22 also, devices on the signal path which are contained within the heat shielding box 8, namely, RXF3, LNA4, LD5 as well as the reception phase shifter 14 and the combiner 15, if these devices are also used, may be divided into s groups, which may be cooled by s cooling units where s is an integer from 1 to 3 when the reception phase shifter 14 and the combiner 15 are disposed within the heat shielding box 8, and is an integer from 1 to 5 when the reception phase shifter 14 and the combiner 15 are disposed outside the heat shielding box 8. This will be readily understood from the technique illustrated in FIG. 29, for example.

Figure 24:
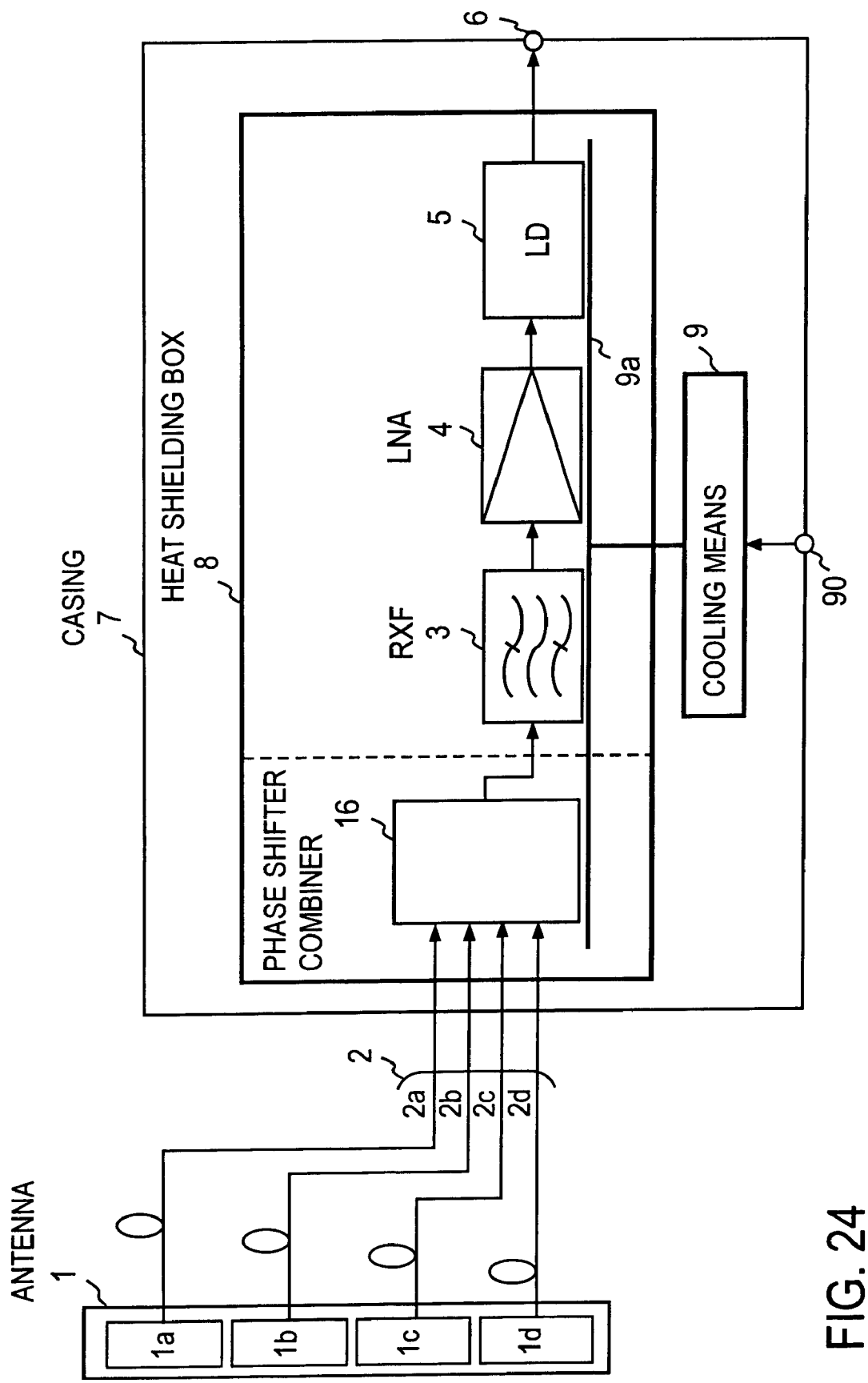
FIG. 24 is a block diagram of an embodiment illustrating the application of the embodiment shown in FIG. 5 to an array antenna high sensitivity receiver.

FIG. 24 shows an embodiment which illustrates the application of the present invention to an arrangement as disclosed in the cited U.S. Patent in which received signals from individual antenna elements are initially subject to a phase adjustment and combining before they are fed to LNA4. Received radio frequency signals from individual antenna elements 1a to 1d are initially subject to an adjustment of phase differences between the individual signals and to a combining in a phase shifter combiner 16, whereby four received radio frequency signals are combined with an equal phase into a single radio frequency signal, which is fed to RXF3 comprising a single filter. The subsequent signal processing takes place in the similar manner as in the embodiment shown in FIG. 5. The phase shifter combiner 16 is contained within the heat shielding box 8 and is cooled by cooling means 9. In this example, the phase shifter combiner 16 is mounted on a cooling member 9a together with RXF3, LNA4 and LD5 to be cooled to a common temperature by a single cooling unit.

In each of the embodiments shown in FIGS. 7 to 16 and using cooling means 9 which includes a plurality of cooling units, the phase shifter combiner 16 may be cooled by any cooling unit to a common temperature as other devices or may be cooled to a different temperature from other devices. It is important to know that it is not always necessary that the phase shifter combiner 16 be cooled to the common temperature as RXF3. As indicated by dotted lines in FIG. 24, the phase shifter combiner 16 may be disposed outside the heat shielding box 8 to reduce the load on the cooling means 9.

Where the reception phase shifter 14, the combiner 15 or the phase shifter combiner 16 is contained within the heat shielding box 8, and is cooled to the common temperature as other device bated with the heat shielding box 8, it is cooled to the common temperature as RXF3 and LNA4. Where it is cooled to a different temperature from LD5, the reception phase shifter 14 or the phase shifter combiner 16 is cooled to the common temperature with RXF3. Where the combiner 15 is cooled to the common temperature as LNA4 and/or LD5, the phase shifter combiner 16 is cooled to the common temperature with LNA4 and/or LD5. Where it is cooled to a different temperature from RXF3, it is cooled by a corresponding one of the cooling units 91 to 93 depending on the requirement. Also in the embodiment shown in FIG. 24, devices within the heat shielding box 8 may be generally divided into s groups, which may be cooled by s cooling units where s is one of 1, 2, 3 and 4 when the phase shifter combiner 16 is used, and is one of 1, 2, 3, 4 and 5 when both the reception phase shifter 14 and the combiner 15 are used.

For any embodiment shown in FIGS. 5 to 24, when the high sensitivity receiver is applied to a base station of a mobile communication system, for example, it is desirable that the antenna 1 of the high sensitivity receiver be used both for the reception and transmission in order to enable a compact and economic construction of a based station equipment. This can be realized by providing an antenna duplexer between the antenna feeder line 2 and RXF3 or between each feeder line 2a, 2b, 2c and 2d from the antenna elements and one of phase shifter circuits 14a, 14b, 14c and 14d or between the phase shifter combiner and RXF3.

Duplexer for the array antenna may be constructed in the similar manner as disclosed in the cited U.S. patent.

Other Embodiments

Figure 25:
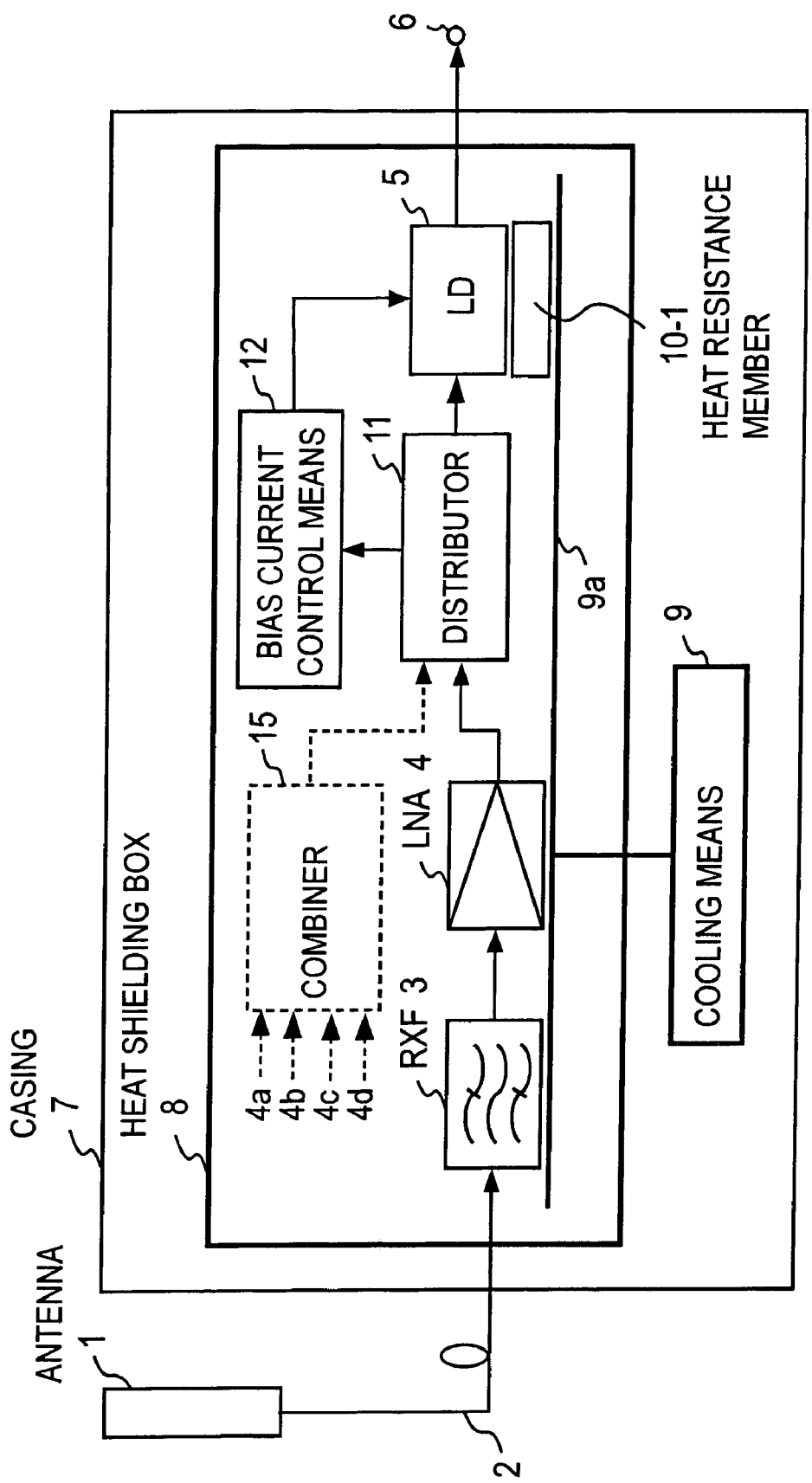
FIG. 25 is a block diagram of an embodiment in which LD current control means is provided on a high sensitivity receiver.

FIG. 25 shows a bias current control of LD5 in accordance with the magnitude of a signal power which is input to LD5, as applied to the embodiment shown in FIG. 7. An output signal from LNA4 is branched by a distributor which distributes the power to be input to LD5 and bias current control means 12. Bias current control means 12 exercises a controlling action by increasing a bias current supplied to LD5 when the input signal has a high power level, and by decreasing the bias current supplied to LD5 when the input signal has a low power level.

Referring to FIG. 26, a bias current control when using LD5 to convert a radio frequency signal to an optical signal will now be described.

Figure 26B:
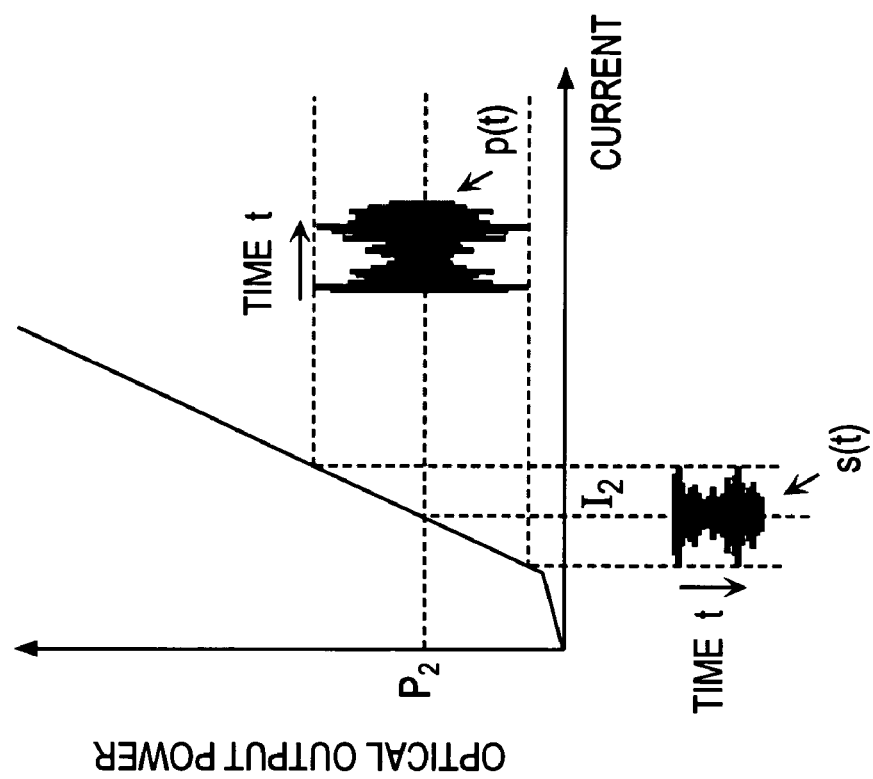
FIG. 26B is an illustration of the principle of using LD to convert a small amplitude radio frequency signal into an optical signal.
Figure 26A:
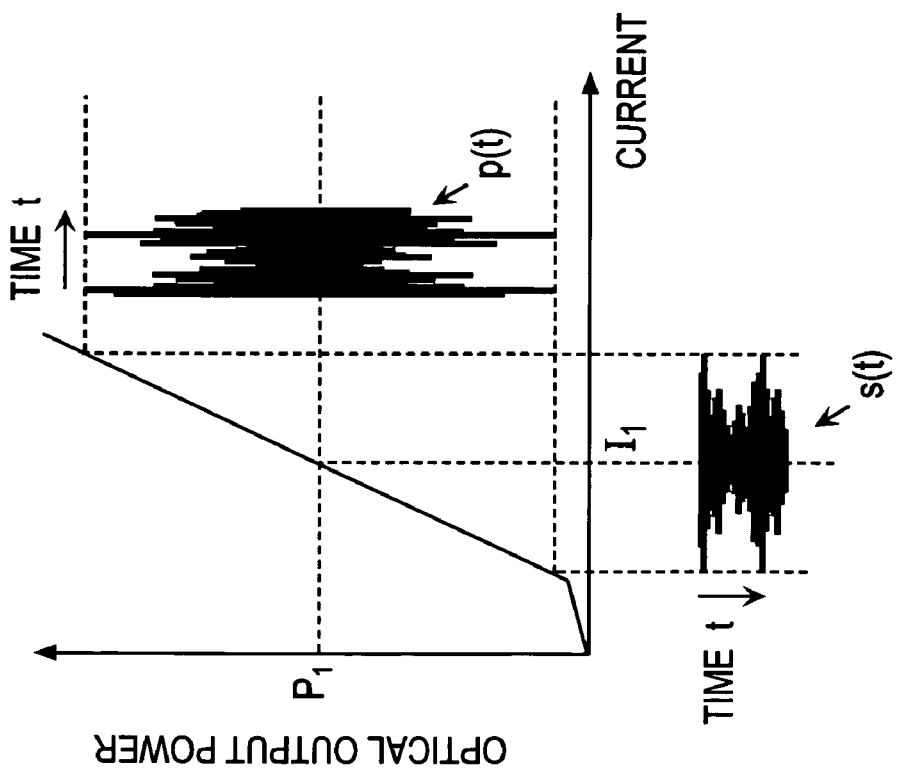
FIG. 26A is an illustration of the principle of using LD to convert a high amplitude radio frequency signal into an optical signal.

FIG. 26A is an illustration when a radio frequency signal s(t) has a largest number of multiplexible channels. In this instance, s(t) has a high power level, and accordingly has a large maximum amplitude. To prevent a clipping from occurring when converting the radio frequency signal s(t) into an optical signal p(t), a bias current to LD5 is chosen to be sufficiently large as indicated by $I_1$, for example. At this time, a mean optical output power $P_1$ from LD5 assumes a high value. A number of received radio frequency signal channels which can be multiplexed by a high sensitivity receiver fluctuates with the variation of communication traffic with time, causing the maximum amplitude of the radio frequency signal s(t) to vary. When the maximum amplitude of the radio frequency signal s(t) is small as illustrated in FIG. 26B, a bias current to LD5 is chosen to be a small current value $I_2$, for example. In this instance, the mean optical output power of LD5 can be reduced to $P_2$. In this manner, the heat value of LD5 can be reduced, reducing the load on the cooling means 9, and at the same time, the aging effect of LD5 can be retarded than when it is always operating with a high bias current and a high mean optical output power. This bias current control of LD5 is applicable to embodiments shown in FIGS. 5, 8 to 16 and 24, and is also applicable to the embodiment shown in FIGS. 17 to 22. In this instance, as indicated in dotted lines in FIG. 25, a distributor 11 is inserted between the combiner 15 and LD5 to allow an output signal from the combiner 15 to be input to the distributor 11.

Figure 27:
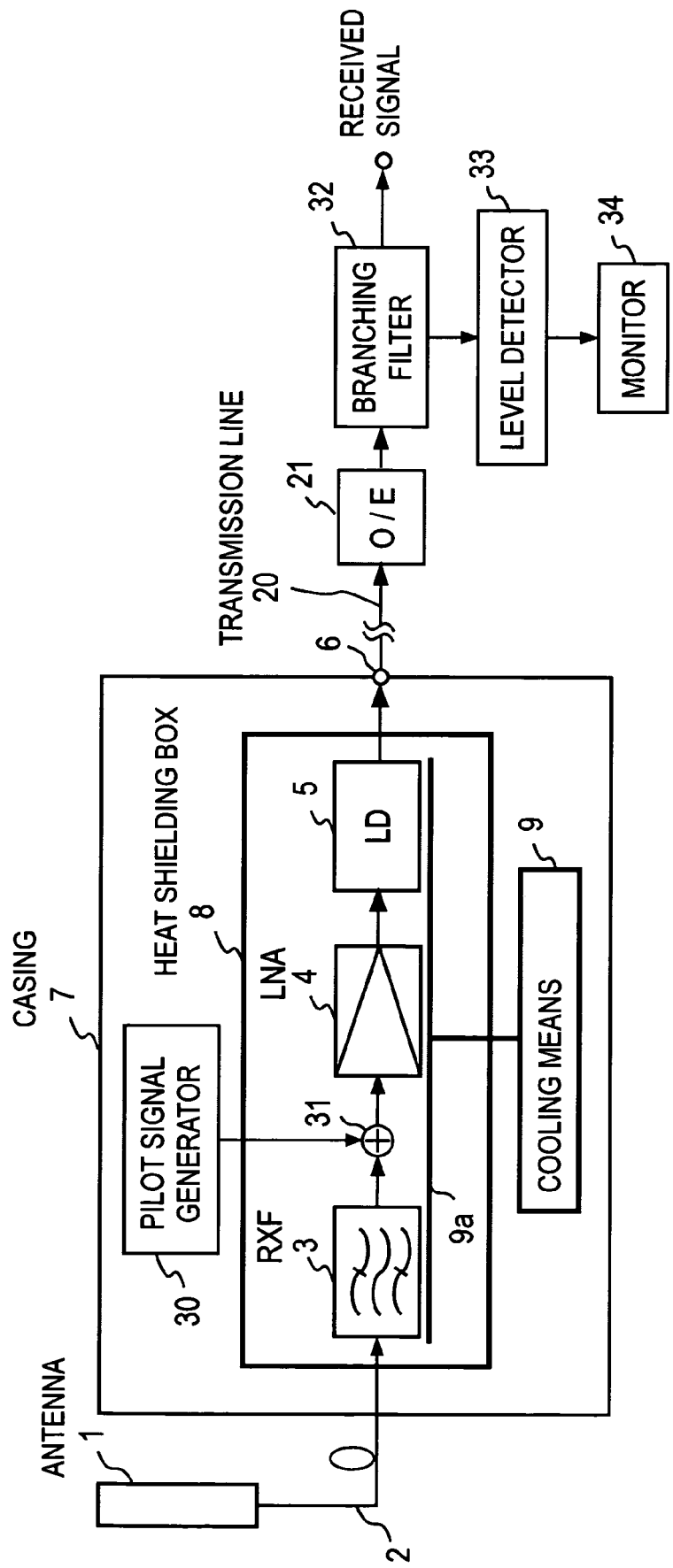
FIG. 27 is a block diagram of an embodiment in which fault monitor means is provided on a high sensitivity receiver.

FIG. 27 shows monitor means employing a pilot signal, as applied to the embodiment shown in FIG. 5. It is to be noted that this monitor means is also applicable to any embodiment shown in FIGS. 7 to 16 and 24.

A pilot signal generator 30 which generates a pilot signal lying within an attenuation band of RXF3 is disposed outside a heat shielding box 8, and there is provided a pilot signal injector 31 which injects the pilot signal generated by the pilot signal generator 30 onto a signal path between RXF3 and LNA4. On the output side of O/E21 disposed on the opposite end from LD5 of a transmission line 20, which is an optical fiber cable transmitting an optical signal from an output port 6, there are provided a branching filter 32 which separates the received signal and the pilot signal, a level detector 33 which detects the level of the separated pilot signal, and a monitor 34 which compares the level of the pilot signal which is detected by the level detector 33 against a preset threshold. The pilot signal generator 30 is not disposed within the heat shielding box 8 in order to alleviate the load upon cooling means 9. A selected level meter which selects a component having the pilot signal frequency and detects the level can be utilized for the level detector 33. The monitor 34 may comprise a reference voltage generator which generates a preset voltage and a comparator, or may be constructed using basic circuits including A/D converter, microprocessor, ROM, RAM and the like.

A pilot signal generated by the pilot signal generator 30 is injected into LNA4 by the pilot signal injector 31. Since the frequency of the pilot signal is set up to lie within the attenuation band of RXF3, the injected pilot signal is input to LNA4 without being radiated from the antennal to cause disturbances to other systems. The received signal which is added with the pilot signal is amplified by LNA4 and is converted into an optical signal by LD5 to be delivered through the output port 6. The branching filter 32 separates the received signal and the pilot signal indoors, for example, and the level of the pilot signal is detected by the level detector 33. The monitor 34 compares the level of the pilot signal which is detected by the level detector 33 against a preset threshold to see if it is lower than the threshold, allowing the occurrence or not of any fault in LNA4 or LD5 within the high sensitivity receiver which is installed outdoors to be detected immediately and in a reliable manner. In this instance, a switching to a reserve LNA4 or LD5 may take place within the high sensitivity receiver.

It is to be noted that the pilot signal injector 31 may be disposed outside the heat shielding box 8.

When the high sensitivity receiver is installed outdoors, a lightening surge protector is inserted within the casing 7 between the antenna feeder line 2 or 2a to 2b and RXF3, or between the antenna feeder lines 2a to 2b and the reception phase shifter 14 or the phase shifter combiner 16 and on any power feeder lines (not shown) feeding respective devices in order to avoid any fault which is attributable to a lightening discharge.

The high sensitivity receiver according to the present invention is robust against a change in the environmental temperature and remains to be a low loss and a low noise while securing a sufficient dynamic range DR of the optical transmission assembly if it is installed outdoors. By confining the reception bandpass filter, the low noise reception amplifier and LD, and any phase shifter, combiner or phase shifter combiner for the array antenna arrangement, within a single heat shielding box to be cooled, the provision of electric cables which are used for signal connection between heat shielding boxes which would be otherwise required when these devices are confined in separate heat shielding boxes can be omitted while simultaneously avoiding a heat flow into each heat shielding box through such electric cable and a resulting increase in the load upon cooling means, thus allowing a compact and economic construction of the entire high sensitivity receiver.

What is claimed is:

1. A high sensitivity receiver comprising
    reception bandpass filter means for receiving a radio frequency signal as an input and for passing a signal in a desired frequency band;
    a low noise reception amplifier for providing low noise amplification of an output signal from the reception bandpass filter means to a desired level;
    a laser diode for converting an output signal from the low noise reception amplifier to an optical signal to be delivered;
    a heat shielding box for confining the reception bandpass filter means, the low noise reception amplifier and the laser diode therein; and
    a cooling means for cooling the interior of the heat shielding box,
    wherein the reception bandpass filter means, the low noise reception amplifier and the laser diode are divided into s groups and the cooling means includes s cooling units each cooling one of the groups where s is one of 1, 2 or 3.

2. A high sensitivity receiver according to claim 1, further comprising:
an array antenna formed by n antenna elements where n is an integer equal to or greater than 2; and
a phase shifter combiner for receiving received signals from the n antenna elements, adjusting phase differences between the received signals and combining them to deliver a combined output as said radio frequency signal to said reception bandpass filter means.

3. A high sensitivity receiver according to claim 2 in which the phase shifter combiner is disposed within the heat shielding box to be cooled.

4. A high sensitivity receiver comprising:
reception bandpass filter means for receiving a radio frequency signal as an input and for passing a sianal in a desired frequency band;
a low noise reception amplifier for providing low noise amplification of an output signal from the reception bandpass filter means to a desired level;
a laser diode for converting an output signal from the low noise reception amplifier to an optical signal to be delivered;
a heat shielding box for confining the reception bandpass filter means, the low noise reception amplifier and the laser diode therein;
a cooling means for cooling the interior of the heat shielding box;
an array antenna formed by n antenna elements where n is an integer equal to and greater than 2;
a phase shifter for receiving received signals from the n antenna elements as inputs and for adjusting phase differences between the received signals to deliver n signals;
said radio frequency signal being n output signals from the phase shifter, which are input to the reception bandpass filter means which comprises n filters for passing signals in desired frequency bands;
said low noise reception amplifier including n amplifiers, into which the n filter output signals are input respectively;
a combiner for combining output signals from the n amplifiers to provide an input to the laser diode; and
the phase shifter and the combiner being disposed within the heat shielding box to be cooled,
wherein the reception phase shifter, the reception bandpass filter means, the low noise reception amplifier, the combiner and the laser diode are divided into s groups and the cooling means includes s cooling units each cooling one of the groups where s is one of 1, 2, 3, 4 or 5.

5. A high sensitivity receiver comprising:
reception bandpass filter means for receiving a radio frequency signal as an input and for passing a signal in a desired frequency band;
a low noise reception amplifier for providing low noise amplification of an output signal from the reception bandpass filter means to a desired level;
a laser diode for converting an output signal from the low noise reception amplifier to an optical signal to be delivered;
a heat shielding box for confining the reception bandpass filter means, the low noise reception amplifier and the laser diode therein;
a cooling means for cooling the interior of the heat shielding box;
an array antenna formed by n antenna elements where n is an integer equal to or greater than 2;
said radio frequency signal being signals received by the n antenna elements, the reception bandpass filter means comprising n filters each receiving a radio frequency signal received by one of n antenna elements for passing a signal in a desired frequency band, the low noise reception amplifier including n amplifiers, to which outputs from the n filters are fed; and
a phase shifter combiner for receiving output signals from the n amplifiers as inputs and for adjusting phase differences between these output signals and for combining the output signals to be input to the laser diode,
wherein the reception bandpass filter means, the low noise reception amplifier, the phase shifter combiner and the laser diode are divided into s groups and the cooling means includes s cooling units each cooling one of the groups where s is one of 1, 2, 3 or 4.

6. A high sensitivity receiver comprising:
reception bandpass filter means for receiving a radio frequency signal as an input and for passing a signal in a desired frequency band;
a low noise reception amplifier for providing low noise amplification of an output signal from the reception bandpass filter means to a desired level;
a laser diode for converting an output signal from the low noise reception amplifier to an optical signal to be delivered;
a heat shielding box for confining the reception bandpass filter means, the low noise reception amplifier and the laser diode therein; and
a cooling means for cooling the interior of the heat shielding box,
wherein the cooling means includes a cooling unit formed by a cooling plate and at least one other cooling unit formed by a cooling plate in combination with a heat resistance member for cooling one or more of the reception bandpass filter means, the low noise amplifier and the laser diode to mutually different temperatures.

7. A high sensitivity receiver comprising:
reception bandpass filter means for receiving a radio frequency signal as an input and for passing a signal in a desired frequency band;
a low noise reception amplifier for providing low noise amplification of an output signal from the reception bandpass filter means to a desired level;
a laser diode for converting an output signal from the low noise reception amplifier to an optical signal to be delivered;
a heat shielding box for confining the reception bandpass filter means, the low noise reception amplifier and the laser diode therein; and
a cooling means for cooling the interior of the heat shielding box,
wherein said cooling means includes a plurality of cooling means, each of which cools one or two of the reception bandpass filter means, the low noise reception amplifier and the laser diode to mutually different temperatures.

8. A high sensitivity receiver comprising:
reception bandpass filter means for receiving a radio frequency signal as an input and for passing a signal in a desired frequency band;
a low noise reception amplifier for providing low noise amplification of an output signal from the reception bandpass filter means to a desired level;

a laser diode for converting an output signal from the low noise reception amplifier to an optical signal to be delivered;

a heat shielding box for confining the reception bandpass filter means, the low noise reception amplifier and the laser diode therein; and and a cooling means for cooling the interior of the heat shielding box, wherein said cooling means includes a plurality of cooling unit formed by a cooling member, each of which cools one or more of the reception bandpass filter means, the low noise reception amplifier and the laser diode to mutually different temperatures.

9. A high sensitivity receiver comprising:

reception bandpass filter means for receiving a radio frequency signal as an input and for passing a signal in a desired frequency band;

a low noise reception amplifier for providing low noise amplification of an output signal from the reception bandpass filter means to a desired level;

a laser diode for converting an output signal from the low noise reception amplifier to an optical signal to be delivered;

a heat shielding box for confining the reception bandpass filter means, the low noise reception amplifier and the laser diode therein;

a cooling means for cooling the interior of the heat shielding box;

a power distributor connected between the low noise reception amplifier and the laser diode for branching part of the signal which is input to the laser diode; and a bias current control means for controlling a bias current supplied to the laser diode in accordance with the power level of the signal which is branched by the power distributor.

10. A high sensitivity receiver comprising:

reception bandpass filter means for receiving a radio frequency signal as an input and for passing a signal in a desired frequency band;

a low noise reception amplifier for providing low noise amplification of an output signal from the reception bandpass filter means to a desired level;

a laser diode for converting an output signal from the low noise reception amplifier to an optical signal to be delivered;

a heat shielding box for confining the reception bandpass filter means, the low noise reception amplifier and the laser diode therein;

a cooling means for cooling the interior of the heat shielding box;

a pilot signal generator preceding the laser diode for generating a pilot signal which is to be added to said radio frequency signal;

an optical/electrical transducer for transducing the optical signal into an electric signal;

a branching filter for selecting the pilot signal from an electrical output signal from the optical/electrical transducer;

a level detector for detecting the level of the pilot signal which is filtered by the branching filter; and a monitor for comparing the level of the detected pilot signal against a preset threshold to detect the occurrence of a fault in at least the laser diode.

* * * * *